(12) United States Patent
Tse-Au

(10) Patent No.: US 8,238,743 B2
(45) Date of Patent: *Aug. 7, 2012

(54) ROUTER HAVING DUAL PROPAGATION PATHS FOR PACKETS

(75) Inventor: Elizabeth Suet H. Tse-Au, Fair Haven, NJ (US)

(73) Assignee: AT&T Intellectual Property I, L.P, Atlanta, GA (US)

( * ) Notice: Subject to any disclaimer, the term of this patent is extended or adjusted under 35 U.S.C. 154(b) by 197 days.

This patent is subject to a terminal disclaimer.

(21) Appl. No.: 12/647,535

(22) Filed: Dec. 27, 2009

(65) Prior Publication Data
US 2010/0098417 A1 Apr. 22, 2010

Related U.S. Application Data

(63) Continuation of application No. 11/851,670, filed on Sep. 7, 2007, now Pat. No. 7,734,172, which is a continuation of application No. 10/298,874, filed on Nov. 18, 2002, now Pat. No. 7,269,348.

(51) Int. Cl.
*H04B 10/00* (2006.01)
(52) U.S. Cl. ............................ 398/9; 398/25; 398/45
(58) Field of Classification Search .............. 398/9, 25, 398/45
See application file for complete search history.

(56) References Cited

U.S. PATENT DOCUMENTS

| | | | |
|---|---|---|---|
| 5,898,687 A | 4/1999 | Harriman et al. | |
| 6,128,666 A | 10/2000 | Muller et al. | |
| 6,259,699 B1 | 7/2001 | Opalka et al. | |
| 6,333,799 B1 | 12/2001 | Bala et al. | |
| 6,512,612 B1 | 1/2003 | Fatehi et al. | |
| 6,584,109 B1 | 6/2003 | Feuerstraeter et al. | |
| 6,625,119 B1 | 9/2003 | Schuster et al. | |
| 6,647,208 B1 | 11/2003 | Kirby | |
| 6,687,247 B1 | 2/2004 | Wilford et al. | |
| 6,768,738 B1 | 7/2004 | Yazaki et al. | |
| 6,785,436 B2 | 8/2004 | Ravikanth et al. | |
| 7,088,716 B2 | 8/2006 | Sugai et al. | |
| 7,200,114 B1 | 4/2007 | Tse-Au | |
| 7,269,348 B1 * | 9/2007 | Tse-Au | 398/25 |
| 7,330,468 B1 | 2/2008 | Tse-Au | |
| 7,626,986 B1 | 12/2009 | Tse-Au | |
| 7,734,172 B2 * | 6/2010 | Tse-Au | 398/9 |
| 7,801,041 B2 | 9/2010 | Tse-Au | |
| 2003/0053486 A1 | 3/2003 | Okamori | |
| 2004/0022539 A1 | 2/2004 | Bannister et al. | |

OTHER PUBLICATIONS

White Paper; "Using Cisco 12000 Series IP Services Engine (ISE) Architecture to Enable the High-Speed Provider Edge;" Cisco Systems, Inc.; Posted Mon. Oct. 1 23:46:26 PDT 2001; pp. 1-9.

Van Campenhout, J., Van Merck, H., Depreitere, J. And Dambre, J; "Optoelectronic FPGAs"; IEEE Journal of Selected Topics in Quantum Electronics; vol. XX, No. Y; Mar. 1999; pp. 1-11.

Welk, Martin H., "network management", network manager, Fiber Optics Standard Dictionary, $3^{rd}$ ed., 1997.

* cited by examiner

*Primary Examiner* — Leslie Pascal

(57) ABSTRACT

A router comprising an interface module (IM), having an optical path and an electrical path and a speed sensor coupled between an input of the router and an input of the IM. The speed sensor is adapted to receive a packet and detect a speed of the IM connection and in response to the speed of the IM connection being above a threshold value, the speed sensor provides the packet to the optical path of the IM and in response to the relative speed being below the threshold value, the speed sensor provides the packet to the electrical path of the IM.

20 Claims, 10 Drawing Sheets

ROUTER HAVING DUAL PROPAGATION PATHS FOR PACKETS

CROSS-REFERENCE TO RELATED APPLICATIONS

This application is a continuation of U.S. patent application Ser. No. 11/851,670, filed Sep. 7, 2007 now U.S. Pat. No. 7,734,172, and which is a continuation of U.S. patent application Ser. No. 10/298,874, filed Nov. 18, 2002, (now U.S. Pat. No. 7,269,348). All of the above cited applications are herein incorporated by reference in their entirety.

FIELD OF THE INVENTION

This invention relates generally to routers and more particularly to a scalable and bi-directionally reconfigurable router architecture.

BACKGROUND OF THE INVENTION

As is known in the art, "a computer network" or more simply "a network" is a connection of computer systems and peripheral devices that exchange data (or more generally information) as necessary to perform the specific function of the network. To exchange information, networks operate in accordance with a set of semantic and syntactic rules referred to as a protocol. One particular type of protocol is the Transmission Control Protocol/Internet Protocol (TCP/IP). When a network operates in accordance with the TCP/IP protocol it is typically referred to as an IP network.

As is also known, a router is a device which interconnects two computer networks. When the networks correspond to IP networks, the router interconnects two computer networks that use a single network layer (layer 3) procedure but may use different data link layer and physical layer procedures. Routers are protocol dependent because they must be able to identify an address field within a specific network layer protocol.

As improvements in network protocols, hardware speed and features occur, it is often necessary to upgrade routers to take advantage of such improvements. Thus, router hardware (HW) upgrade or more generally, network hardware expansion to accommodate end user demand on higher speed/capacity or more advanced set of QoS features is an important process to an IP network as well as other types of networks. With respect to IP networks, network hardware expansions/upgrades must be done to maintain an internet service provider's (ISP's) ability to continue to offer state-of-the-art value-added (and sometimes bandwidth intensive) IP services.

There are in general three types of layers in an ISP network hierarchy: "edge," "hub," and "backbone." Since the functionality required for every layer is different, to upgrade or expand router hardware, it must be done separately for each individual network layer. That is, router functionality required of an "edge" layer is different from router functionality required of a "hub" layer, which in turn is different from the router functionality required of a "backbone" layer. Hence internal architectures amongst the edge, hub or backbone routers today are vastly different from one another. With this difference in functionality and internal architecture, to perform field upgrades, it is often necessary to acquire new routers for each individual layer in the network hierarchy. The new routers also often need to be lab-tested to ensure interoperability with existing hardware and software, an often time-consuming effort before field deployment can be made possible.

Assume, for example, that it is desired to perform network hardware expansion to add capacity to a router to accommodate more end users. This translates to adding more input/output (I/O) cards to expand the router's port capacity. However, it is not possible to add more I/O cards "on demand" without a new switch fabric (SF) replacement if the capacity for target expansion were not already built into the router SF at its first implementation. This is because capacity of most conventional router SFs (e.g. bus or crossbar) cannot be easily expanded on demand. Hence, considering the time and manpower consumption required to implement a replacement router SF, it is often less expensive to acquire a new router rather than utilizing the router SF replacement.

Moreover, the functionalities of "edge", "hub" and "backbone" routers cannot be interchanged without also undertaking the time-consuming task of altering internal router hardware architectures required to adapt to the functionality of each router at the "target" network layer. Consequently, other routers in the network are typically not available as hardware resources to rapidly address upgrade or expansion needs of the different layers.

For example, an "edge" router cannot become a "hub" or "backbone" router without first undertaking a number of time-consuming and manpower-intensive modifications such as reconfiguring internal hardware architecture to take off or disable all internal quality of service (QoS) control plane functionalities and associated memories and database (for example, those for traffic policies/rules and network resource administration and management). Depending upon the original router hardware architectural implementation, this may involve physical alteration of internal hardware components such as dismantling of databases (e.g., tables) mounted on a computer board and installing new lookup functions to adapt to the hardware architectures appropriate for use as a backbone, and modification of internal packet-processing data paths through the router. In particular, it may be required to disable or dismantle physical wires that lead to a policy database/lookup table that is no longer useful in a "backbone" environment (e.g a policy database/lookup table such as packet prioritization based on rules). Also, if the data path were originally pipelined, the pipeline would need redesign since some pipeline stages must be skipped (or taken out) due to the disabling of the above-mentioned hardware components. Furthermore, such a pipeline modification may impact and thereby induce a change in the router's clock speed.

Furthermore, each of the above steps is labor-intensive and thus costly and time-consuming. Hence, upgrade of backbone routers using edge routers is rarely if ever done due to the labor and expense of hardware architectural alteration/rework necessary stemming from the completely different internal hardware designs for "edge" and "hub/backbone" routers in most vendor products. Thus, when a "backbone" router upgrade/expansion is desired or necessary, a new router is typically purchased.

Similarly, it is also labor-intensive to adapt a "backbone" or "hub" router today for use as an "edge" router as it would entail the reversal of a number of the tasks listed above. For example, the process would include reconfiguring the router internal hardware architecture by installing quality of service (QoS) control plane functionalities and associated memories/databases on policies/rules, and network resource administration and management. Also, depending upon the desired target router hardware architectural implementation, the above-mentioned reconfiguration may also involve installing added databases and rewiring to accommodate added physical wires leading to the added databases/memories on a computer board, and if the packet-processing data path was pipelined, the pipeline must be redesigned to accommodate additional stages of database fetching/reading, making the pipeline longer and thus more complex, which could result in degradation of the overall performance of a router.

One attempt to improve network performance has been to reduce the number of layers. The Cisco 12000 Series IP Server Engine, available from Cisco Systems, Inc. of San Jose Calif., leverages the distributed architecture of the chassis with features that allow service providers to reduce both the number of layers and the number of boxes in the POP. It collapses the access/aggregation and distribution layers into a single layer with dense (channelized 2.5 Gbps), all-optical aggregation of existing transmission technologies on the customer side and 10 Gbps upstream connections within the POP. The network is less complex because there are fewer overall connections and fewer devices to manage.

Another problem which occurs is that a capacity/speed conversion or upgrade of an ISP network having multiple layers of network hierarchy often involves putting together different vendor equipment for the different network layers, as one vendor may not supply routers with different functionalities required for use in different layers of the network. For example, one vendor may specialize only in supplying routers for use at the "edge" layer but not the 'backbone" layer, and vice versa. In such situations, lengthy and expensive network interoperability testing and field (confidence) testing must be conducted for the different equipment from different vendors in the different network layers. This results in a relatively long lead-time being required in the hardware expansion/upgrade process for all network layers. This is especially true when the expansion/upgrade involves new network features/functionalities. Hence, since router hardware expansion/upgrades must often be done network-wide for all network layers to ensure interoperability after the expansion/upgrade, the problem of costly and manpower intensive router hardware upgrades is exasperated with an increase in the numbers of network layers.

Another problem is that since IP QoS control is distributed in each individual router in conventional systems, only hop-by-hop non-optimal, instead of global, view of QoS control is possible. With QoS control in its distributed form, conventional router hardware architectures cannot scale to include whole-path data storage capacity needed for network whole-path QoS provisioning within the router itself due to router size and/or central office space constraints, among other inefficiencies. The reason being that to provision conventional routers with global knowledge for network whole-path-related QoS control would mean enormous expense since it would be necessary to equip each router with numerous built-in databases that yield such network-wide information. Examples are: policy information base, path QoS state information base, flow information base, multicast tree/state control server, multicast tree/state information base, policy control server, among others. Such provisioning is difficult to achieve within the limited space of a router chassis and with equipment footprint size restriction inside the limited space of a central office for routers.

Moreover, frequent and time-consuming synchronization of states amongst routers (often by message exchange in the form of a network protocol) is needed to ensure network-wide data/state coherence. With the inability to scale efficiently to include whole-path data storage capacity needed for network-wide QoS provisioning, an individual router has no global view of the bandwidth resource for arbitrary routes in the network. Consequently, it is highly inefficient for a router to provision value-added overall network-wide whole-path-related services such as IP-based VPN which involve routes elsewhere in the network the bandwidth resource status of which is not known to the router unless the router spends the time to "ask" for it via message exchange in the form of specific protocols.

In view of the above, it is clear that conventional router hardware architectures are not designed for cost- and manpower-efficient network hardware expansions or upgrades. In most cases in which a network hardware expansion/upgrade corresponds to a router hardware expansion/upgrade, the router hardware expansion/upgrade is synonymous with purchasing new routers. This approach results in the expenditure of large amounts of capital and manpower resources, as well as long hours of "costly" downtime for all parties involved (e.g. ISPs and end users).

The conventional processes for performing a network hardware expansion or upgrade are cost-inefficient and manpower intensive. Consequently, many companies (e.g. AT&T, Corp.) spend a tremendous amount of energy and resources in the process of network hardware expansions/upgrades.

It would, therefore, be desirable to provide a system which allows network hardware expansion or upgrades (including router hardware expansions or upgrades) to be accomplished efficiently in terms of dollar and manpower resources. It would also be desirable to provide a system and technique which allows a router to be reconfigured as an "edge", a "hub" or a "backbone" router on-demand in order to induce efficient network hardware expansion or upgrades even in the face of network layering complexity (e.g. ISP network layering complexity).

SUMMARY OF THE INVENTION

In accordance with the present invention, a multi-path router includes a filter for receiving a packet header (either the header alone or as part of the whole packet) and determining the needs of the packet header and for selecting one of: (1) a time-sensitive path, (2) a non-time-sensitive path and (3) a special needs path in response to the needs of the packet header. The multi-path router also includes a Router Special Needs Agent (RSNA), coupled to the filter and adapted to receive the packet headers (either alone or as part of the whole packets) having special needs services.

With this particular arrangement, a multi-path router capable of rapid bi-directional hardware reconfigurability is provided. The RSNA component primarily performs the "edge" layer/(Quality of Service) QoS control plane functions and administers management and control for headers of packets with special (e.g., priority/network resource) requirements. In addition to QoS control plane, the RSNA also performs some data plane functions in the processing of the packet headers. By utilizing the RSNA as part of an overall router hardware architecture, the router is quickly "bi-directionally" interchangeable either downward as "edge router", or upward as a "hub or "backbone router," and provides an immediate hardware resource suitable for use in all layers of a network hierarchy such as an internet service provider (ISP) network hierarchy, for example. The multi-path router thus allows speedy and yet manpower and cost-efficient network hardware expansions/upgrades and network emergency fixes/responses to be performed which is not possible with conventional router hardware architectures.

The router hardware architectures of the present invention operate as follows. Every router in the network has a connection to the RSNA (which could be either internal or external to the router) and every router has two different operating modes: (1) an "edge mode" and (2) a "hub/backbone mode." These two modes are mutually exclusive of each other. A router becomes an "edge" router and serves the edge functions by activating the "edge" mode within the router. This corresponds to turning on active CoS/QoS provisioning between the configurable router and the RSNA such that the RSNA provides active CoS/QoS provisioning for packets entering the router and such that the router operates in an edge router mode. Likewise, a router becomes a "hub" or "backbone" router by turning on the "hub/backbone" mode within the router. This corresponds to turning off active CoS/QoS provisioning by the RSNA such that the router operates in a hub/backbone router mode. This mode can include passive CoS/QoS provisioning. An I/O card speed adjustment for the two different modes can be done via reprogramming of a re-programmable interface module (IM) receiver (i.e., the I/O card "slot") through a craft graphical user interface (GUI).

The multi-path router also includes an interface module (IM) (or line card) adapted to be disposed in the IM receiver. The IM includes a forwarding engine. The packet/header processing functions within the forwarding engine located in each IM (e.g. header filtering, table lookup, packet queuing and scheduling) are provided from re-programmable hardware-based chips (e.g. field programmable gate arrays (FPGAs) and/or application specific integrated circuits (ASICs)) arranged in pipeline format to achieve very high speed processing; for example, one task per CPU cycle is possible, independent of incoming traffic rate.

Internal packet header processing functions of the RSNA are also carried out via re-programmable hardware-based components (e.g., FPGAs, ASICs) arranged in pipeline format for very high speed packet (header) processing. Exemplary functions carried out via the programmable hardware-based components are packet header filtering, packet drop queuing, and packet drop priority table lookup. Thus, including reprogrammable components in the routers enables router adaptation on-demand to the constant changes of network features including IP network features.

The router also includes a network interconnect module (NIM), i.e., a switch fabric. Three candidate switch fabrics can be used in the router architectures described hereinbelow. One switch fabric is of the "indirect" interconnection network (IN) family—the Bi-directional Multistage Interconnection Network (BMIN). Two other switch fabrics are of the "direct" IN k-ary n-cube family—the 2-ary, n-cube or hypercube, and k-ary 3-cube or 3-D Torus. All three switch fabric candidates are modular and can be expanded on-demand. However, expansion of the k-ary n-cubes requires that the desired IM/processor interface capability and channel bandwidth at the maximum expanded capacity to be pre-allocated to existing Ns and channels at the first implementation. The underlying reason is to accommodate the increase in traffic volume that comes with an increase in the number of IM resources after the expansion, whereas expansion of the BMIN can be done without disturbing the existing physical capacity of the existing MIN infrastructure.

"Edge" mode, "hub/backbone" mode, and their relationship to the RSNA are further explained below. Briefly, however, the "hub/backbone" mode enables the router to filter incoming packets based on packet header "tags" that are previously administered by the RSNA in communication with the upstream "edge" router from which the packet came. In addition, depending upon implementation, this mode may either enable the router's RSNA connection to be turned "off" altogether or to still be "on" and enter passive QoS/CoS provisioning for packets. An example of implementation for this latter case could be as follows. When a router turns on the "hub/backbone" mode, it automatically sends a message to inform the RSNA that it is now in "hub/backbone" mode, and starts listening to and executing commands from the RSNA. The RSNA may request, for example, that the router reserve certain bandwidth capacity for an upcoming stream of packets with certain header "tags."

When the router operates in the "edge" mode, this enables the router's RSNA connection to be "on" which allows the router to communicate with the RSNA via a request/response session. A request to the RSNA is a packet header that needs classification or priority information. A response from the RSNA is a newly updated/"tagged" packet header. Moreover, "edge" mode operation enables the router itself to filter headers of incoming packets based on a predetermined set of rules, e.g., some combination of the following 5-tuples: source/destination IP addresses, source/destination port numbers and protocol, to determine if it's one of: (1) a "special needs" packet, (2) a "non-time-sensitive" packet; and (3) a "regular" packet.

The details of each of the three types of packets mentioned above as well as the processing of each will be described below in conjunction with the figures. In general overview, however, the packet headers are separated into different logical paths for processing (e.g. one logical path for "special needs" packets, one logical path for "non-time-sensitive" packets, and one logical path, that is, the "time-sensitive" path, for "regular" packets). As will be explained below, in some cases the headers are updated while on the respective different logical processing paths. Once the headers return from their respective path, they are rejoined to their respective payloads and the whole packets go through the "time-sensitive" logical processing path of the router which physically comprises the router's data plane. In other words, all packets eventually go through the "time sensitive" logical processing path of the router. One exception to this rule is for those packets destined for the Network Processor Module (NPM) of the router. The overall effect of this path separation for processing packet headers with different needs is, hardware-wise, a much simplified and speedy data plane for processing all packets passing through the router.

The above approach using the ON/OFF capability to the RSNA provides a router with rapid bi-directional reconfigurability which can be utilized either during either a network hardware expansion/upgrade or emergency situations, by turning on the router's "edge" mode or "hub/backbone" mode according to need (e.g. according to the need of an ISP).

During emergency situations, for "edge" routers to act as a temporary "hub" or "backbone" router, the process includes grouping together several "edge" routers to meet the throughput requirements of a "hub" or "backbone" router, turning on each router's "hub/backbone" mode and adjusting each router's I/O line rates via reprogramming of the IM receivers as needed.

During emergency situations for "hub/backbone" routers to act as temporary "edge" routers, the process includes turning on the "edge" mode of the hub/backbone" router, and adjusting the router's I/O line rates via reprogramming of the IM receivers as needed to provide a desired (ideally the quickest) emergency fix/response turn-around time.

One example of a network emergency situation occurs if some "hub" or "backbone" routers unexpectedly stop operating properly or at all. In this case, the network hierarchy can be quickly reconfigured such that some "nearby" "edge" routers can temporarily take over as "hub" or "backbone" routers and continue functioning, and vice-versa for the unexpected stop of an "edge."

During a network hardware expansion/upgrade operation to increase traffic throughput for "hub/backbone" routers, the process to automatically become an "edge" router includes turning on the "hub/backbone" router's "edge" mode and adjusting via reprogramming the I/O line rates of the IM receivers as needed to provide a desired (ideally the quickest) provisioning turn-around time.

During a network hardware expansion/upgrade operation to increase traffic throughput for "edge" routers to become "hub/backbone" routers, the process includes turning on the "hub/backbone" mode of the router and adjusting line rates of the IM receivers as needed and either grouping together several "edge" routers to meet the throughput requirements of a "hub" or "backbone" router, or if time permits, by adding more IM receivers and wiring connections to expand the router switch fabric. It should be noted that the latter is possible only if the existing router's CPU has adequate processing power to handle the target line rates.

By providing a router which can be rapidly bi-directionally reconfigured during network hardware expansion/upgrade or emergency situations (i.e. where a "hub" or "backbone" router" can quickly turn into an "edge" router and vice-versa) the router architecture and processes of the present invention make network hardware expansion/upgrade and emergency fix/response independent of the number of layers within the network hierarchy (e.g. an ISP network hierarchy). This characteristic is difficult, if not impossible, to achieve with conventional router hardware architectures. In other words, the systems and processes described herein enable rapid, efficient network hardware expansion/upgrades and network emergency fix/responses even in the face of network layering complexity (e.g. ISP network layering complexity). The present invention thus not only saves manpower and capital-costs, also reduces the network downtime intervals during these network events for all parties involved (e.g. ISPs and end users).

Furthermore, if the RSNA is implemented as an independent network component physically separate from the router, the invention yields the added benefit of a flexible, scalable and cost-effective hardware architecture which provides routers with global knowledge and information on an overall network path view needed to provision services that require network-wide QoS control. The router architectures described herein thus also enables routers to cost-effectively provision Internet protocol (IP) services with quality of service (QoS) controls that require overall global network path view, such as customer-specific virtual private networks (VPNs), with individually different service-level agreements. Network whole-path based QoS control is difficult to achieve with conventional router hardware architectures since the QoS control is in distributed form within each individual router. Examples of overall global information are network-wide path resource reservation, capacity and path-state, these are needed to support optimal, meaningful network whole-path-based QoS service provisioning, such as multicasting and VPN.

The rapid bi-directional reconfigurability/interchangeability for network hardware expansion/upgrade and emergencies, and other benefits mentioned above, cannot be achieved with conventional router hardware architectures. This is especially the case with network emergencies, such as sudden router malfunctioning or death since a common current solution of such a situation relies on network protocols (e.g., OSPF) to inform all other network routers of the topology update, to avoid the troubled router(s).

The present invention also results in lower cost to perform network hardware expansion/upgrades including router hardware expansion/upgrades. In particular, significant savings in capital cost is achievable with the novel router architectures described herein since instead of having to buy new routers for network hardware expansion/upgrade and providing spares for network emergencies as is currently done, existing network routers can be reused and expanded upon. Further, additional savings are provided since the above described architecture using the RSNA significantly reduces cost (e.g., testing), manpower and turn-around time for network hardware expansion/upgrade and network emergency situations of every layer within the network hierarchy. Thus, having a router hardware architecture which can be rapidly scaled and bi-directionally reconfigured for all layers of the network hierarchy (i.e. edge, hub or backbone) simplifies, streamlines and reduces costs associated with expansion/upgrade and emergency fix/response process.

In one embodiment, a multi-path router hardware architecture referred to as Baseline Reconfigurable Limited Scalable (BRLS) router which adheres to the concept of hardware scalability and bi-directional hardware reconfigurability via use of an internal RSNA is described.

The BRLS model serves as a baseline architecture from which other hardware architectures for a scalable bi-directionally reconfigurable router can be developed. Such an architecture may be used to provide, for example, a scalable bi-directionally reconfigurable Internet Protocol (IP) router. An IP router provided in accordance with the BRLS model can be applied as a matching router hardware solution for the newly emerging concept of a single-layer IP network architecture.

The BRLS also utilizes a switch fabric that is capable of incremental expandability. The BRLS uses switch fabric hardware, and re-programmable hardware capabilities that allow adaptation "on-demand" to the changing needs of IP and other networks.

It should be appreciated, however, that architectural scalability of a BRLS router is largely limited to the router's data plane only and not the QoS control plane. This is due, at least in part, to the fact that it has a non-distributed router architecture with RSNA as part of the internal components of the router. The consequence is that the QoS control plane can't scale to include network whole path data storage capacity needed for network whole path QoS provisioning, but only hop-by-hop view for QoS control is possible.

In another embodiment, a multi-path router architecture which utilizes an external RSNA (i.e. an RSNA which is external to the router hardware itself) is referred to herein as a one-architecture-fit-all scalable reconfigurable router (OSR). The RSNA is a distinct server/database entity responsible for the CoS/QoS control plane that dynamically provides packets with resources and reservation information pertaining to an overall network view.

Like the BRLS architecture, the OSR architecture may also be used to provide, for example, a scalable bi-directionally reconfigurable Internet Protocol (IP) router which provides a router hardware solution for the newly emerging concept of a single-layer IP network architecture.

The OSR achieves bi-directional hardware reconfigurability by its use of the external RSNA and also utilizes a switch fabric that is capable of incremental expandability, and thus corresponds to a scalable, bi-directionally reconfigurable router. The OSR uses switch fabric hardware, and re-programmable hardware capabilities that allow adaptation "on-demand" to the changing needs of IP and other networks.

It should be appreciated, however, that architectural scalability of an OSR router is not limited to the router's data plane and can extend to the QoS control plane. This is due, at least in part, to the fact that the RSNA is a physically separate entity that can serve more than one OSR router in its network domain of responsibility and has overall (network) view of network topology information. The consequence is that the QoS control plane can scale to include network whole path data storage capacity needed for network whole path QoS provisioning.

For both the BRLS and OSR embodiments, the RSNA function is always on for a BRLS or an OSR router designated as "edge", but may be off for a BRLS or an OSR router designated as either "hub" or "backbone." Bi-directional reconfigurability immediately follows with this on/off flexibility to the RSNA, which can be used either during network hardware expansion/upgrade or emergency situations.

The BRLS and OSR hardware architectures make use of currently available state-of-the-art technology in the market place. The BRLS and OSR architectures are each arranged in a specific way to achieve speedy bi-directional reconfigurability/interchangeability to perform different roles on-demand depending on the router's desired physical placement in the network hierarchy. The architectures also provide for efficient scalability to adjust to network capacity growth demand with flexible adaptation to changing network features. End users benefit from shortened network hardware expansion/upgrade downtime interval. ISPs and other service providers benefit from shortened network hardware expansion/upgrade downtime interval and ability to harness router technology growth as well as other network technology growth. Network hardware and router vendors/developers benefit from the ability to directly address service provider needs.

In still another embodiment, an architecture utilizes a hybrid reprogrammable chip technology with one being electronic FPGAs or ASICs and the other optoelectronic FPGAs. The architecture also uses a sensor technology to sense incoming traffic speed and based on the sensor result, to route traffic accordingly either via the "almost all-optical" or the "electrical/optical" hardware technology path through the router. The only non-optical part in the "almost-all-optical" processing path is the optoelectronic devices that implement the router's data plane functions within the IMs. This architecture provides all of the benefits of the BRLS and OSR architectures as explained above, as well as the benefit of an "almost all-optical" incoming-traffic-speed-independent hardware path for packet processing through the router.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Before describing the present invention, it should be understood that reference is sometimes made herein to operation of the present invention in connection with internet protocol (IP) networks. Such reference is intended only for clarity and clearness in explanation and description and should not be construed as limiting. It should be understood by those of ordinary skill in the art, that the concepts, apparatus and techniques described herein find application in a wide variety of networks including but not limited to IP networks. Reference is also sometimes made herein to forwarding a packet header to a particular location within a router or to a router special needs agent (RSNA) or to a certain physical or logical path. It should also be understood that in some applications it may be desirable or even necessary to forward the entire packet rather than the packet header alone. Similarly, when reference is made to forwarding or processing a payload, it should be understood that in some applications it may be desirable or even necessary to forward the entire packet rather than the payload itself. Also, in some instances certain components/elements referred to herein below are described as being either implemented as hardware-based functional units or implemented as processors (i.e. implemented via software). It should be understood by those of ordinary skill in the art that most components/elements can be implemented in either hardware or software and that a variety of factors are considered in determining whether it is preferable to implement any particular components/elements in hardware or software.

Figure 1:
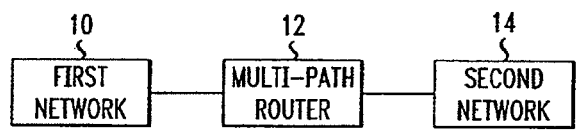
FIG. 1 is a block diagram of a network having a reconfigurable router.

Referring now to FIG. 1, a first network 10 is coupled through a multi-path router 12 to a second network 14. The first network may correspond, for example, to a local area network (LAN) and the second network may correspond, for example, to an internet. As will be explained in further detail below in conjunction with FIGS. 2-11, the multi-path router 12 is "configurable" meaning that it has the ability to be configured (or re-configured) "downward" as "edge" or "upward" as "hub/backbone" router on demand. Additionally, after being configured as an "edge" or a "hub," the router can be re-configured back to its original arrangement/function. This means that if the router was originally arranged as an "edge" router it can be configured as a "hub" router and then later re-configured back to an "edge" router again. The reverse is also true, that is, the router may first be configured as a "hub/backbone" and then "configured" (or "re-configured") as an "edge". The router can be repeatedly configured and re-configured between "edge" and "hub/backbone" router configurations. Thus, the router is also said to be "bi-directionally configurable" (or "bi-directionally re-configurable)." With these characteristics, the router can be versatile depending upon its physical placement within a network hierarchy. The multi-path router of the present invention can be provided using a methodology for reconfigurability and seven basic principles of hardware scalability and hardware reconfigurability as described by E.S.H. Tse-Au in "Design and Analysis of Scalable Reconfigurable IP Routers", Ph.D. Dissertation, Dept. of Computer Science, Stevens Institute of Technology, Nov. 19, 2001.

Figure 2:
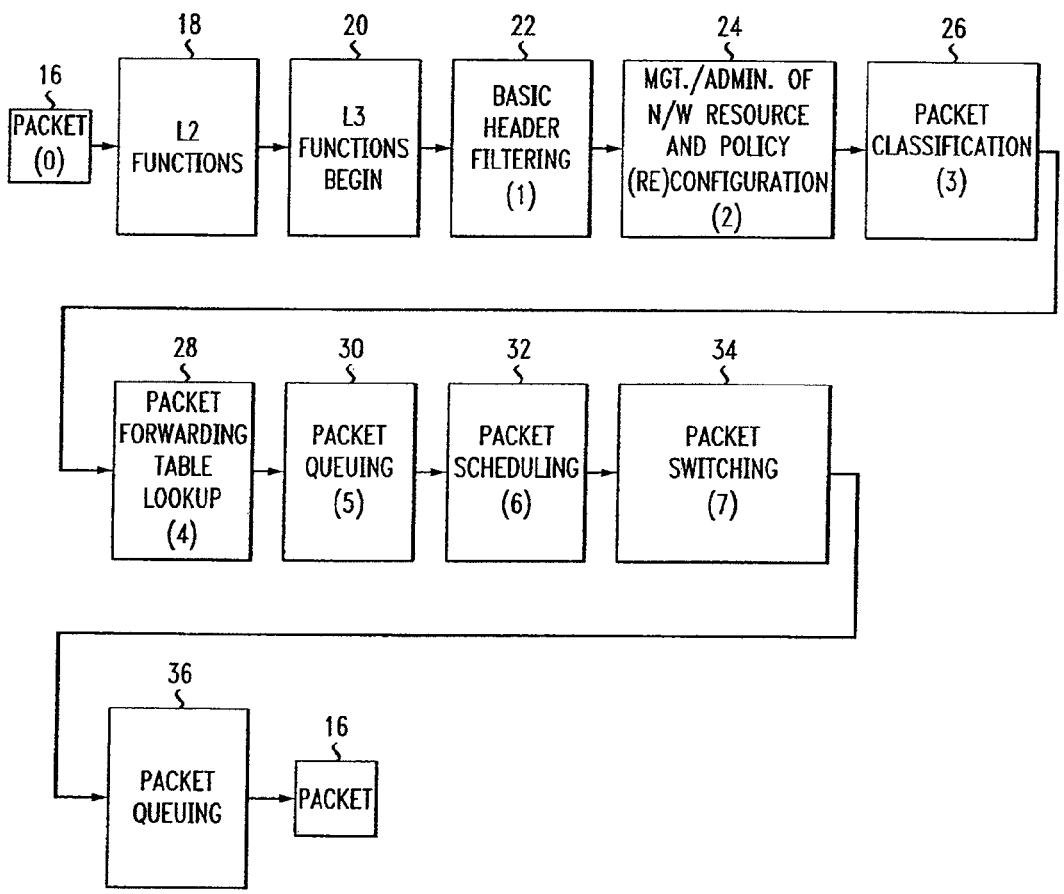
FIG. 2 is a flow diagram for internet protocol (IP) packet forwarding tasks analysis.

Referring now to FIG. 2, a flow diagram of the fundamental packet processing/forwarding functions in a router is shown. The forwarding/processing operation of a packet 16 can be fundamentally partitioned into eight steps which reflect the basic requirements for IP header processing. As shown in steps 18 and 20, an incoming packet is received and processed for level two (L2) and level three (L3) functions.

As part of the L3 functions, the packet header is first filtered as shown in step 22. The filtering includes but is not limited to basic error, header length and IP option checking. Next, in step 24 a packet header classification control step is performed in which the packet is subject to admission/security control, packet prioritization, MPLS labeling, tagging, resource re-configuration control (e.g., buffer/network path resource management and reservation).

Packet classification is then performed as shown in step 26. In this step the packets are classified according to the function to be performed and/or queuing priority as indicated by the header destination address, priority/restriction designation. An example of functions to be performed is those packet(s) to be dropped per the header tag indication. Next, in step 28 a packet forwarding process in which a forwarding table lookup step is performed for packet header update with new destination port, TTL, etc.

The packet is then queued in step 30 per the classification made in step 26 and designated destination port in step 28 and then, as shown in step 32, the packet is scheduled per the classification. Next, the packet is switched to and queued at the appropriate output port as shown in steps 34, 36.

The QoS control plane functions are those functions associated with step 24. Hence, "edge" routers must be able to perform steps 16 and 22-34 (i.e. eight steps) for packet processing including step 24 for the QoS control plane functions, whereas "hub/backbone" routers need all but step 24 in FIG. 2. In particular, the QoS control plane is responsible for but not limited to the setting of policies and rules for packet classification control, admission control, and network resource administration.

Figure 3:
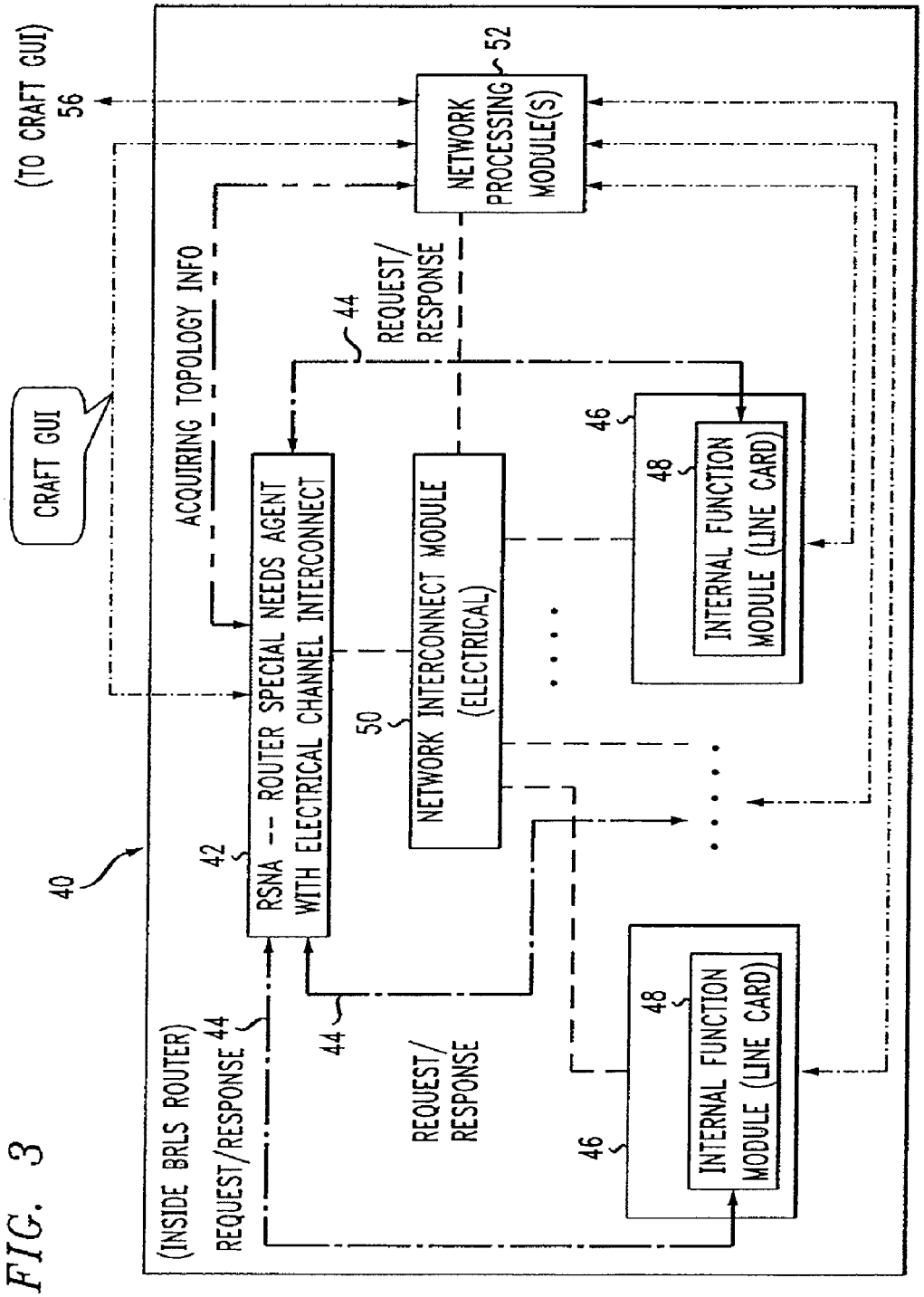
FIG. 3 is a block diagram of an architecture for a Baseline Reconfigurable Limited Scalable (BRLS) Router.

Referring now to FIG. 3, a portion of a Baseline Reconfigurable Limited Scalable (BRLS) router 40 includes a router special need agent (RSNA) 42. The RSNA 42 is a hardware component that is part of the router architecture that takes on functions of not only a Quality-of-Service (QoS) control plane, but also some data plane functions. Communication between the RSNA and other portions of the router is via request/response messages 44.

It should be noted that the RSNA 42 is part of the router's internal functional units. Other descriptions on possible implementation of the RSNA for a BRLS router are provided below. The BRLS router includes one or more general purpose IM receivers 46 each of which includes an IM or line card 48. Each of the line cards 48 are coupled to (or in communication with) the RSNA 42 via request/response messages 44. The IM receivers 46 are also coupled to a network interconnect module (NIM) 50 and a network processing module (NPM) 52. The NIM 50 is the router's switch fabric and the NPM 52 is the router's network processor (or CPU). The RSNA 42 acquires topology information from the NPM 52.

A craft GUI 56 is coupled to the NPM 52. Through the craft GUI, new algorithms or new administrative roles/policies can be rapidly installed into the appropriate functional units to adapt to changing features.

Requests to the RSNA 42 are in the form of headers of packets that need to have "classification tags" according to its specific requirements. Similarly, response from the RSNA 42 is the "newly tagged" updated packet header itself.

Classification tags are assigned, for example, by matching QoS/Class-of-Service (CoS) information, e.g., the TOS—Type of Service—byte, or the 5-tuples: source/destination IP address, source/destination port number, and protocol, indicated in the packet header according to the RSNA's internal data structures on classification rules and policies.

Request/response sessions to the RSNA are triggered whenever an "edge/ingress" router receives a packet with a header indicating special service requirements that can't be fulfilled by processing through either the router's data plane or the router's central processing unit (CPU). The responses are preferable in the form of already updated packet headers. Thus, the router itself further processes the header by performing table lookup, integrating it with its payload and then queuing the packet according to updated "instructions" in the header.

Hence, in addition to administering and provisioning policy and control, the RSNA 42 actually must identify/sort out individual headers of packets according to their special requirements and "tag" each according to its internal policies/rules, etc. that meet the requirement. The purpose of executing these data plane functions in the QoS control plane is to reduce the data plane functionality (in the router) to a "bare minimum" thereby achieving the uniformity of only having generic functions in the data plane for all routers, whichever kind of router it is: "edge", "hub" or "backbone". This thus provides one important concept to hardware reconfigurability: a unified internal hardware architecture of the "Methodology for Reconfigurability" as that term (i.e. the term reconfigurability) is explained in the above-identified Tse-Au thesis. For example, with RSNA taking on packet header updating functions, sophisticated packet classifiers are no longer needed, but rather only simple classify function suffices in the data forwarding path within any router, where speed is of the essence.

In one embodiment, every router in the network has a connection to the RSNA. The RSNA function/connection is always ON for a router designated as "edge", but may be OFF for a router designated as either "hub" or "backbone", depending on implementation. One example of implementation that requires this connection to be ON for a router designated as "hub" or "backbone" is in I. Khalil, T. Braun, "Implementation of a BW Broker for Dynamic End-to-End Resource Reservation in Outsourced Virtual Private Networks", Proceedings, 25th Annual IEEE Conference on Local Computer Networks, LCN 2000, pp. 511-519.

As mentioned above in conjunction with FIG. 1, configurability (or reconfigurability) refers to the ability of a router to be (re-)configured "downward" as "edge" or "upward" as "hub/backbone" router. "Bi-directional configurability" (or "bi-directional reconfigurability") refers to the ability of a router which is first configured as an "edge" to then be configured as a "hub/backbone" and then again as an "edge". The reverse is also true, that is, the router may first be configured as a "hub/backbone" and then "configured" (or "re-configured") as an "edge". This ability to be repeatedly configured in either of two directions is referred to herein as "bi-directionality." This ability immediately follows with the on/off flexibility provided by the RSNA. Thus, the router can be versatile depending on its physical placement within the ISP network hierarchy.

Figure 4:
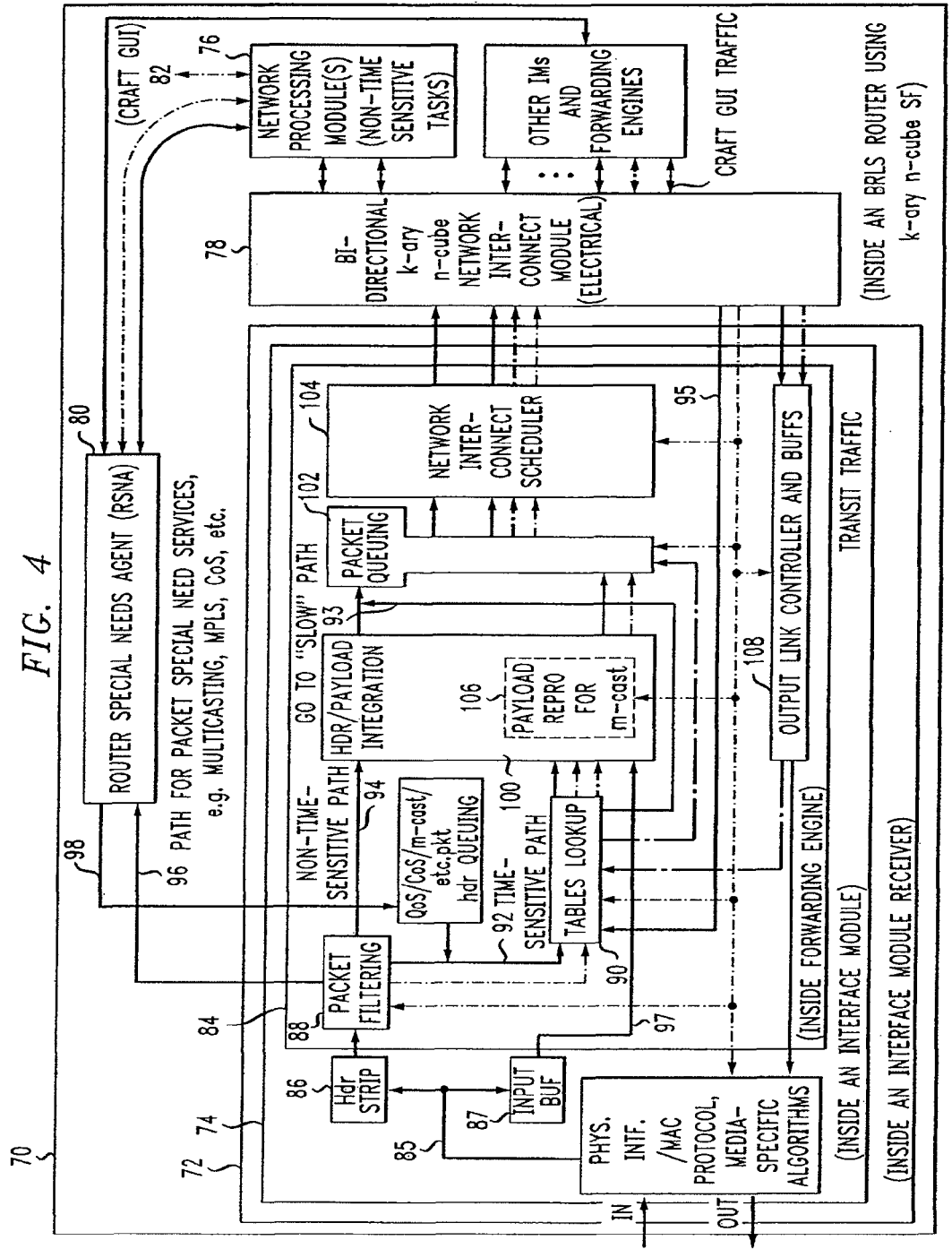
FIG. 4 is a functional block diagram of a Baseline Reconfigurable Limited Scalable (BRLS) Router interface module (IM) and router which uses K-ary N-cube as the switch fabric.

Referring now to FIG. 4, a Baseline Reconfigurable Limited Scalable (BRLS) router 70 includes an interface module (IM) receiver 72 which contains an Interface Module (IM) 74 (i.e., the router's network interface or input/output line card); one or more (centralized) Network Processing Module(s) (NPMs) 76; a CoS/QoS preserving Network Interconnect Module (NIM) 78; and a Router Special Needs Agent (RSNA) 80. The IM 74 and the RSNA 80 may be similar to the IM 48 and RSNA 42 of FIG. 3.

It should be appreciated that a BRLS router can be bi-directionally (re-)configured as "hub", "edge", or "backbone" router as desired, for example, during network hardware expansion/upgrade or emergency situations via use of not only the RSNA but also the general-purpose IM receiver 72. Being general-purpose, this receiver is identical in all routers and allows IMs of any functionality (be it "edge", "backbone" or "hub") to be operationally compatible when inserted into the receiver in any BRLS router.

All internal functional components of the BRLS router such as the logic level chips within the IM, are interconnected together via a high-speed electronic connection. It should be appreciated that the particular embodiment of the BRLS router shown in FIG. 4 does not include any optical components although in some applications, it may be desirable or even necessary to provide the BRLS router having at least some optical components.

Likewise, the interiors of each functional component within the RSNA, e.g., logic level chips as well as all channels interconnecting the functional components, are connected together via high-speed electronic connections. It should, however, be appreciated that in some applications it may be desirable or even necessary to provide the RSNA having at least some optical components. As the IM receiver is identical in all BRLS routers, the difference in throughput between an "edge" and a "hub/backbone" router is achieved using a modular interconnection. That is, an "edge" router will have a smaller number of IMs/IM receivers (thereby curtailing the amount of throughput) than a "hub/backbone" router.

As shown in FIG. 3, request/response messaging actually takes place between each individual IM 48 (of the BRLS router) and the RSNA 42. As also shown in FIG. 3, there exists a craft Graphical User Interface (GUI) 56 at the router's NPM 52.

In E. S. H. Tse-Au, "Design and Analysis of Scalable Reconfigurable IP Routers", Ph.D. Dissertation, Dept. of Computer Science, Stevens Institute of Technology, Nov. 19, 2001, three candidate switch fabrics (SFs) are found to be capable of serving a scalable bi-directionally reconfigurable IP router. These switch fabrics are: hypercube, 3D Torus Mesh, and Multistage Interconnection Networks (MINs).

Any of the above-three candidate SFs can be used in describing the hardware architecture of the present invention and two of the three SFs: (hypercube and 3D Torus Mesh) belong to a common class of Interconnection Networks (INs) called k-ary n-cubes. It should thus be noted that a k-ary n-cube was arbitrarily selected as the SF in the component descriptions provided herein below. Those of ordinary skill in the art should appreciate of course that a k-ary n-cube, a MIN or any switch fabric having the following characteristics could be used.

Shared (vs. dedicated) packet transfer hardware paths amongst all packets, but most importantly, Ease of incremental (hardware) expandability/contractibility with respect to the incremental space and/or incremental capacity requirements required on demand. Incremental capacity requirement refers to the notion that only the incremental amount of network capacity (e.g. number of hardware components, associated bandwidth requirements) needed to accommodate the incremental expansion at the moment must be considered in the expansion. A router hardware architecture that fulfills this requirement is one the existing infrastructure of which before the expansion doesn't need to already have the capacity desired at the maximum expanded configuration be pre-provisioned. Whereas incremental space requirements refer to the notion that only the required physical space be just enough to accommodate the incremental capacity needed for expansion at the moment must be considered.

The BRLS router of FIG. 4 includes an intelligent re-programmable hardware-based forwarding engine a portion 84 of which is shown in FIG. 4. The forwarding engine is capable of forwarding and switching via the use of re-programmable hardware-based functional units, and also has one or more (software-based) processors to perform miscellaneous, non-time-sensitive tasks such as traffic statistic compilation and accounting. It performs all physical layer/MAC layer functions, functions for receiving/transmitting/processing ATM cells of fixed size, and multiprotocol data frames of any size. The forwarding engine also has primary responsibility for the distributed processing and forwarding of all packets going through the router. Depending upon its nature, there are in general three types of packets as follows.

A first type of packet is known as a "regular" packet. "Regular packets" are those packets with no errors/IP options, or those not requiring special services such as priority queuing, packet drop, admission policy control, etc. This type of packet requires processing only through functions within the router's data plane.

A second type of packet is known as a "non-time-sensitive" packet. "Non-time-sensitive" packets are those packets requiring attention of the NPM (i.e. packets going to the NPM). Such packets include, but are not limited to, packets with errors (so-called "errored packets"), IP options, those destined to the router itself (e.g. control packets) or those having an address which could not be found in the Tables Lookup of the router.

A third type of packet is known as a "special needs" packet. "Special needs" packets are those packets with special processing requirements such as multicasting, broadcasting, MPLS, priority classification control, policy control, etc.

Using the above background, an overall view of packet processing through the IM is provided. As shown in FIG. 4, upon entry to the router IM for Open Systems Interconnection (OSI) Level 3—Network Layer processing 85, a packet is stripped of its header 86 and the header goes through the initial packet filtering 88 and/or Tables Lookup functions 90 while the packet payload is stored in a buffer 87. Based on result of this initial header filtering, packet header processing is separated into three different "logical" processing paths: a "time-sensitive" path 92; a "non-time-sensitive" path 94; and an RSNA "special needs" paths 96. These paths are briefly described as follows:

(a) the "time-sensitive" logical processing path is the path that physically comprises all functions in the data plane. As will become apparent from the description below of the "non-time-sensitive" and "RSNA" logical processing paths, the "time-sensitive" logical path is used by all three types of packets mentioned above. However, a vast majority of the packets that will be using this path are "regular" packets, since they don't require any special processing beyond that provided by the processing functions in the router's data plane. For "regular" packets, upon receipt of an output port address from Tables Lookup in the "time-sensitive" logical processing path, headers of these "regular" packets join their own payload at the Header/Payload Integration Unit 100. "Whole" packets then go through the rest of the data plane functions in the "time-sensitive" logical processing path to be journeyed through the switch fabric (after packet queuing 102 and scheduling 104) to the intended output port.

(b) the "non-time-sensitive" logical processing path is used for processing errored packets and other packets requiring the attention of the NPM as well as those packets whose destination addresses are not found in the Tables Lookup. The "non-time sensitive" logical processing path for the errored packets and those other packets destined to the NPM itself is different than the "non-time sensitive" logical processing path for packets whose destination addresses are not found in the Tables Lookup function. Considering first those packets destined to the NPM itself (e.g. control packets), after passing through the packet filtering function 88, stripped headers on the "non-time sensitive" logical processing path 94 rejoin their payloads at the Header/Payload Integration Unit 100, and from that point on the rejoined "whole" packets go through the rest of the data plane functions for transfer to the NPM.

Considering next those packets with headers which contain destination addresses not found in the Tables Look-up Unit, after passing through the packet filtering function and the Tables Lookup function only the packet header will be forwarded to the NPM. The NPM will be described in detail further below. Suffice it here to say that the NPM has a master table of addresses and for packet headers with destination addresses that couldn't be found in the IM's forwarding table, the NPM does address lookup, updates the header and then sends the header back to the Tables Lookup unit of the originating IM to be processed again. The packet header is sent to the NPM by "skipping" over the Header/Payload Integration Unit 100 via path 93. Payloads of the headers being sent to the NPM for address update remain in the input buffer 87 awaiting return of the headers. Thus, those packet headers with destination address not found in Tables Lookup are sent through the logically "slow" path to the NPM for address lookup and the input buffer stores payloads of these packets until the updated header returns from the NPM to the Tables Lookup.

Upon return from the NPM on path 95, the updated packet headers go through Table Lookup 90 in the "time-sensitive" logical processing path to get output port assignments. Once the port assignments are provided, the corresponding payloads are sent to the Header/Payload Integration Unit on path 97 and the header rejoins the payload at the Header/Payload Integration Unit 100. From that point on, rejoined "whole" packets go through the rest of the data plane functions in the "time-sensitive" logical processing path to be journeyed through the switch fabric (after packet queuing 102 and scheduling 104) to the intended output port.

(c) The RSNA path is used for processing packets the headers of which indicate "special needs." Packet headers that are processed through this path journey to the RSNA for packet header "tag update" via the request/response communication session. Upon return from the RSNA 98, the updated header then goes through the rest of the data plane functions in the "time sensitive" logical processing path starting with Tables Lookup through it's journey across the switch fabric (after packet queuing 102 and scheduling 104) to the intended output port.

In view of the above, it should thus be appreciated that while the packet headers are separated into different logical paths for processing (e.g. the three logical paths described above). However, once updated headers return from all three paths, they will rejoin their respective payloads and the "whole" packets go through the rest of the "time-sensitive" logical processing path. In other words, all packets (except for those destined for the NPM itself) eventually go through the "time sensitive" logical processing path. The overall effect of this path separation for processing headers with different needs is, hardware-wise, a much simplified and speedy data plane for processing all packets passing through the router.

Part of the IM is a media/speed neutral general-purpose IM receiver that supports all interfaces and speeds which a BRLS router supports. One example of a general purpose IM receiver is Juniper router's IM receiver in its M20 gigabit edge/backbone routers and M40 gigabit backbone routers, respectively capable of 20 Gbps and 40 Gbps aggregated speed. The IM receiver design for these two routers are exact replica of each other such that all physical IMs supported by the two routers can be interchangeable in the two routers' chassis.

For the IMs in the BRLS router, the IM receivers will have N: 1 sparring (i.e., there's one hot standby for every N IM receivers) and an IM will be hot swappable.

To compliment the general-purpose IM receiver concept, IMs that are "fully capable" are necessary to serve the "edge", "hub" and "backbone" function in an IP network. "Fully capable" is the ability to do at least the following: (a) adaptation to a multiplicity of connection technologies; (b) channelization to a multiplicity of speed requirements under the multiple connection technologies (e.g., GE, DSL); and (c) multiplexing/de-multiplexing.

At this point in time, the aggregate speed of channelization for "edge" routers is at most OC12 but the current industrial trend is to increase the aggregate speed to OC192 while retaining the channelization capability over the OC192→fractional T1/DS0 spectrum, and flexible adaptation to heterogeneous connection technologies. Hence, the notion of "fully capable" IMs will continue to improve as channelization technology under multiple connection types matures over the next few years.

Router architectural scalability is addressed by complete functional partitioning of all functions for the packet-forwarding path within the forwarding engine. Examples are filtering, table lookup, queuing, scheduling. Each of these functions has its own dedicated data structures and memory capacity needed to perform its specific operation, is implemented as hardware-based algorithms using (re-)programmable hardware such as Field Programmable Gate Arrays (FPGAs) and re-programmable Application-Specific Integrated Circuits (ASICs), and is arranged in pipeline fashion for efficient packet/header processing. In preferred embodiments, a craft GUI interface is utilized to (re-)program as needed all of the (re-)programmable hardware-based functions to adapt to the dynamic needs of a network (e.g. an IP network) to respond to the continuous network feature changes and traffic growth demand.

The header/payload integration unit 100 is not part of the fundamental packet-forwarding functions, but can also be implemented via hardware based algorithms. The integration unit performs two major operations: (a) integration of updated packet headers (with the new routing information) back to the corresponding packet payload; and (b) based on the new routing information, segmenting an entire packet into fixed-size units and assigning each fixed-size unit a packet identifier (for packet re-assembly purposes) in preparation for packet queuing and scheduling for transfer through the SF.

In case of multicasting, the RSNA 80 is responsible for producing multiple packet headers needed for the different destinations in a multicast session. Whereas the header/payload integration unit is responsible for producing the corresponding number of packet payloads 106, keeping track of and integrating each payload to its corresponding updated header when it arrives back from the RSNA. When the new routing information for the packet is obtained during integration, the header/payload integration unit then treats each packet in a multicast session as a normal packet. It segments each into fix-sized unit, assigns each unit with packet identifier based on the new routing information, and queue the fix-sized unit per this identifier for preparation to transport through the SF for the multiple destinations in the multicast session. The exact details of how the two main operations (listed above) are done or the size of the fix-sized unit, is implementation dependent.

The output link controller 108 is responsible for scheduling the use of output links (or uplinks) to output packets from various input (down)links. To address the anticipated need for assigning packets with possibly a wide range of incoming speeds to uplinks that also differ widely in BW capacities in future IP traffic environments, a brief overview of the scheduling method used by this output link controller is provided. For the following discussion, it is assumed that each input (down) link will not carry input traffic with speed greater than (>) the nominal bandwidth (BW) of that input link. However, input (down)links can carry input traffic with speed less than (<) its nominal BW capacity. As a general design rule-of-thumb a downlink should always be assigned an uplink the BW capacity of which is at least equal to itself, not lower, unless: (a) the incoming packet speed from this downlink is "detected" to be ≦the nominal BW capacity of an uplink that has a lower nominal BW capacity than that of this downlink; or (b) the incoming packet speed from this downlink is "detected" to be >the nominal BW capacity of an uplink that has a lower nominal BW capacity than this downlink nominal BW capacity, and there exists a network emergency, such as when the current uplink being used is dead and no other uplink of comparable speed is available.

Hence, to accommodate congestion or unforeseen network events, there are in general two assignment methods an output link controller can use: (a) when all uplinks have similar or higher nominal BW capacity than any one of the downlinks, assign each downlink a designated primary and secondary uplink. Then assign an output packet to its secondary uplink if its designated uplink is congested or malfunctions. This method of assignment induces the effect that all uplinks are used in parallel, so that the net achievable theoretical output is the aggregate BW capacity of all the uplinks during normal operation; and (b) when ≧1 uplinks have lower nominal BW capacity than ≧1 downlink(s)', assign an output packet to an uplink based on packet's incoming traffic speed or incoming link BW capacity as follows: (1) if the downlink nominal BW capacity from which the packet came is ≧any of the output (up)link's nominal BW capacity, assign the packet from this downlink as in Method (a); else (∃ uplink(s) the nominal BW capacity of which is <this downlink's own), then assign an output packet to an available uplink the nominal BW capacity of which is ≧the packet's "detected" incoming traffic speed (for this case, ∃ no concept of primary or secondary uplink).

This method of assignment induces the net effect that lower speed input traffic will go to lower nominal BW capacity output (up)links, including the "lower" speed packets that came in through a high nominal BW capacity input (down) link; and higher speed input traffic will go to higher nominal BW capacity output (up)links during normal operation.

It should be noted that the scenario described in method (b) above is possible in a router with downlinks that vary widely in speed limits (e.g., DS0 and OC192) and with uplinks that are of comparably large difference in speed range. In such scenarios, lower speed input traffic is assigned an output (up)link of relatively lower BW capacity and higher speed input traffic is assigned an output (up)link of relatively higher BW capacity under normal operations. Of the two, method (a) is currently the norm as the BW capacity of uplinks today is at least the same as the BW capacity of any one downlink within the same router.

The set of output buffers 108 include packet reassembly buffers for re-assembling each segmented packet back together, re-sequencing buffers for the purposes of packet re-ordering to meet in-order delivery requirement, and smoothing buffers to meet QoS provisioning needs, before transporting packets into the output link. These output buffers temporally hold not only (reassembled) packets that are destined to the output, but also "transit (segmented) fix-sized units" of packets that come from some IMs and destined to other IMs. This is due to the fact that all IMs serve as intermediate IMs for some (segments of) packets in a k-ary n-cube SF. Within an intermediate IM, a routing decision must be made to select the (next channel or) next IM to route the (segmented) packet to as part of its journey to destination IM. These "transit fix-sized units" go through table lookup to make a routing decision as to which channel to route to in its next hop to destination IM. This type of table lookup would be based on header "tags" and therefore require the availability of only simple routing/classification information to perform the routing task. Upon completion of table lookup, these "transit fix-sized units" go through queuing and scheduling again for switching through the k-ary n-cube SF.

The RSNA 80 is an independent functional component that is part of the internal router architecture. It is responsible for the CoS/QoS Control Plane, and some amount of data plane functions, and provides packets with resource and reservation information pertaining to hop-by-hop view of the network.

One example of a data plane function is the production of multiple packet headers needed for the different destinations in a multicast session at the receipt of an IP packet header having a multicast requirement. As previously described, the RSNA communicates with the IMs via request/response messages. The "request" being a packet header that needs to be "tagged"; and the "response" being the "newly tagged" updated packet header itself.

The RSNA 80 coordinates with the Network Processing Modules (NPMs) 76, to obtain updated network topology information for use with its rules/policies. Communication with the NPM could be via file transfer format, to accommodate large topology tables that may be required at times, or could be via request-response format if small amount of information exchange is involved, or both, depending upon implementation. To induce parallelism of operation, packet headers with different QoS/CoS policy requirements are processed in different queues. Within each queue that processes headers of packets with similar requirements, all functional units, i.e., algorithms such as table lookup and scheduling per the QoS/CoS requirements indicated in the header, are (re-)programmable hardware-based and are arranged in pipeline format for efficient packet header processing. Furthermore, these internal functions are interconnected to one another via electrical channels.

As the internal algorithms are re-programmable hardware-based, the craft GUI interface 82 through the NPM 76 is available for re-programming purposes. This interface 82 is also used to (re-)configure new policies/classification rules to the RSNA's internal data structures to accommodate the increasingly sophisticated and dynamic QoS provisioning needs over IP.

The Network Processing Module (NPM) 76 is a control engine primarily responsible for master route table maintenance, "external" routing protocol operations with other routers within an IP network, "internal" routing protocol operations of the SF, and processing of non-time-sensitive/exception condition tasks, e.g., management and error protocol operations. Examples of "external" routing, error and management protocols processed by the NPM(s) are ICMP, RIP, OSPF, BGP, SNMP, ARP, RARP, etc. (The type of internal routing protocols varies with the type of SF used.) The NPM doesn't perform any packet forwarding function. As mentioned above, for packet headers with destination addresses that couldn't be found in the IM's forwarding table, NPM does address lookup, updates the header and then sends the header back to the Tables Lookup unit of the originating IM to be processed again. Moreover, the NPM provides a craft GUI for router management, maintenance and programming interface to (re-)program, i.e., (re-)configure, all hardware (either ASIC and/or FPGA)—based algorithms in each IM and in the RSNA. Examples of hardware-based algorithms are packet filtering, packet queuing based on tags, media-specific algorithms, table lookup, and configuration of new policies/rules (this last item applies for the RSNA only, not the IM). As the router NIM is all electrical, the NPM has a corresponding electrical SF channel interface.

Other tasks that NPM performs are: (a) notification and distribution of updated network topology, multicasting, unicasting, other (hop-by-hop view) path information to RSNA; (b) packets with IP options; (c) frame relay mapping operations; (d) distribution of updated route tables for "external" IP network routing to the IMs; (e) distribution of updated route tables to the IMs for "internal" SF routing (e.g., the best routes using Wormhole routing to get from a source to a destination IM to avoid faulty conditions within the k-ary n-cube SF); and (f) distribution of (new) programs to each hardware-based algorithm within each IM and the RSNA;

It should be noted that ARP/RARP/Frame Relay Mapping operations are not considered time-sensitive protocol operations in this proposal and thus are processed by the NPM. Packets with these needs are in the minority and the implementation of their operations and associated lookup tables at each IM (i.e., at the time-sensitive path) may delay other "time-sensitive" operations that must get done within the IM.

Due to the non-time-sensitive nature of task processing by the NPM, a general-purpose CPU can be used to satisfy its processing needs. To address the need for redundancy in case of failure, there will be a second active standby NPM within the NIM infrastructure (described below).

The network interconnected module (NIM) 78 is an interconnection infrastructure that connects amongst the intelligent IMs and Network Processing Modules (and also the RSNA in this architecture) via bi-directional electrical channels. Using K-ary n-cube as the SF, the NIM is capable of incremental hardware expandability and hence IMs can be added to scale according to traffic capacity growth. The NIM's responsibilities include: (1) transfer of (segments of) "regular" packets, i.e., those with no "special needs" and "special needs" packets (that are already "tagged" by and have returned from the RSNA) between input IM and output IM (these two types of packets can therefore be processed via the "time-sensitive" path); (2) transfer of packet headers with "special needs" to the RSNA; (3) transfer of (segments of) control packets or (segments of) packets between IMs/RSNA and the NPM(s), e.g., those that can be processed via the "non-time-sensitive" path, such as (updated/new) programs to (re-)program the (re-)programmable hardware-based functions within the IMs and the RSNA and updated routing information (external or internal) to the IMs; and (4) occasional transfer of packet headers (either "regular" or "special needs") between the IMs and NPM(s) for which the destination address could not be found in the forwarding table.

It should be appreciated that all connections between RSNA and NPM(s), and between RSNA and IMs are actually part of the NIM. However, as FIG. 4 is a functional diagram, they are drawn away from the NIM to clearly illustrate their functional interworking relationship.

Provided below is a description of how the BRLS router hardware architecture provides for (1) hardware scalability to grow and adjust according to the network capacity growth demand with flexible adaptation to changing IP network features; and (2) bi-directional hardware reconfigurability to perform different roles depending on router's physical placement in the ISP network hierarchy: "edge", "backbone" or "hub" layer.

In particular, an explanation is provided for the latter how this solution can be used for efficient hardware expansion and feature/speed conversion, such as during network hardware expansion/upgrade and emergency network rescue situations.

(1) Hardware Scalability: The BRLS router described above is readily implementable with the current state-of-the-art technology. Within the BRLS framework, the ability to accommodate a feature-rich set of QoS capabilities and with increasing throughput requirement can be addressed by use of reprogrammable hardware-based functional units in the BRLS router and in the associated RSNA. The reprogrammable hardware-based functional units enable reprogramming of up-to-date entries to "appropriate" tables and algorithms for fast table search to provide appropriate QoS features. Scalability to meet increasing throughput demands is further provided by the partitioning and pipelining of each (re-)programmable hardware-based function used in the packet (or header) processing paths within the BRLS router and the associated RSNA. For example, with a full pipeline, one task per CPU cycle could be achieved. This arrangement allows parallelism of operation, divides and conquers, and thus enables the BRLS router and the associated RSNA the ability to process traffic efficiently at very high speed in a traffic-volume independent manner.

As the SF to be employed by the BRLS router is capable of incremental hardware expandability (k-ary n-cube or MIN—Multistage Interconnection Network), the BRLS router also has the HW flexibility to add I/O ports and adjust according to traffic capacity growth demands. Moreover, reprogrammability of the individual functional units within the router and within the associated RSNA provide for flexible adaptation to the constant changes in QoS/CoS provisioning needs along with exponential traffic growth within an IP network.

Per the above description of the packet-forwarding path's setup within the BRLS router and the RSNA component, and the notion that BRLS utilizes SFs capable of incremental hardware expandability, hardware scalability to high traffic volume ensues in the data plane. However, even though the RSNA by itself can handle a large volume of traffic, the fact that it is part of the router internal architecture limits the router's QoS control plane scalability.

As IP networks evolve to provide continuously more QoS/CoS-based service offerings that require overall network view information, a built-in RSNA function as part of the router simply will not be able to scale in terms of expansion, to the whole path data storage capacity needed to meet this demand. Only a hop-by-hop non-optimal view of network resource capability could be offered in this built-in configuration, and hence the need for global synchronization of state among routers in the network. A built-in RSNA function also increases the implementation complexity, as RSNA must be integrated/evolve with other router internal functions. For example, in the case of faster RSNA QoS/CoS table lookup algorithms, once one router upgrades to it, then all routers in the network must upgrade to it in order to be able to communicate with one another. Any policy change will also involve effort to upgrade all routers in the network.

(2) Bi-directional Reconfigurability: Bi-directional reconfigurability is achieved with the on/off flexibility provided by every router's connection to the RSNA. This bi-directional reconfigurability can be used either during network hardware expansion/upgrade or emergency situations. During emergency situations, the bi-directional reconfigurability is used to turn "edge" routers into "hub/backbone" routers by clustering together several "edge" routers to meet the throughput requirements of a "hub/backbone" and to turn "off" the RSNA (as called for by the implementation) and to have "Hub/backbone" routers act as "temporary" edge routers by simply turning "on" the RSNA.

During a network hardware upgrade/expansion operation to increase traffic throughput for "Hub/backbone" routers to automatically become new "edge" routers is accomplished by turning "on" the RSNA, providing the quickest provisioning turn-around time. "Edge" routers become "hub/backbone" routers by adding more IM receivers, IMs and channels, and by turning "off" the RSNA (as called for by the implementation). It should be noted that the limit on the top number of receivers is bounded by engineering choice in practice. Moreover, if k-ary n-cube is used as the SF, the above addition can be made possible only if the existing IMs and channel wires in the existing NIM infrastructure have enough capacity ready for expansion when first implemented. This means that existing IMs should have a sufficient number of interface pin outs and existing channels should have sufficient BW capacity to cope with the increased traffic volume resulting from an increased number of IM traffic sources.

Figure 5:
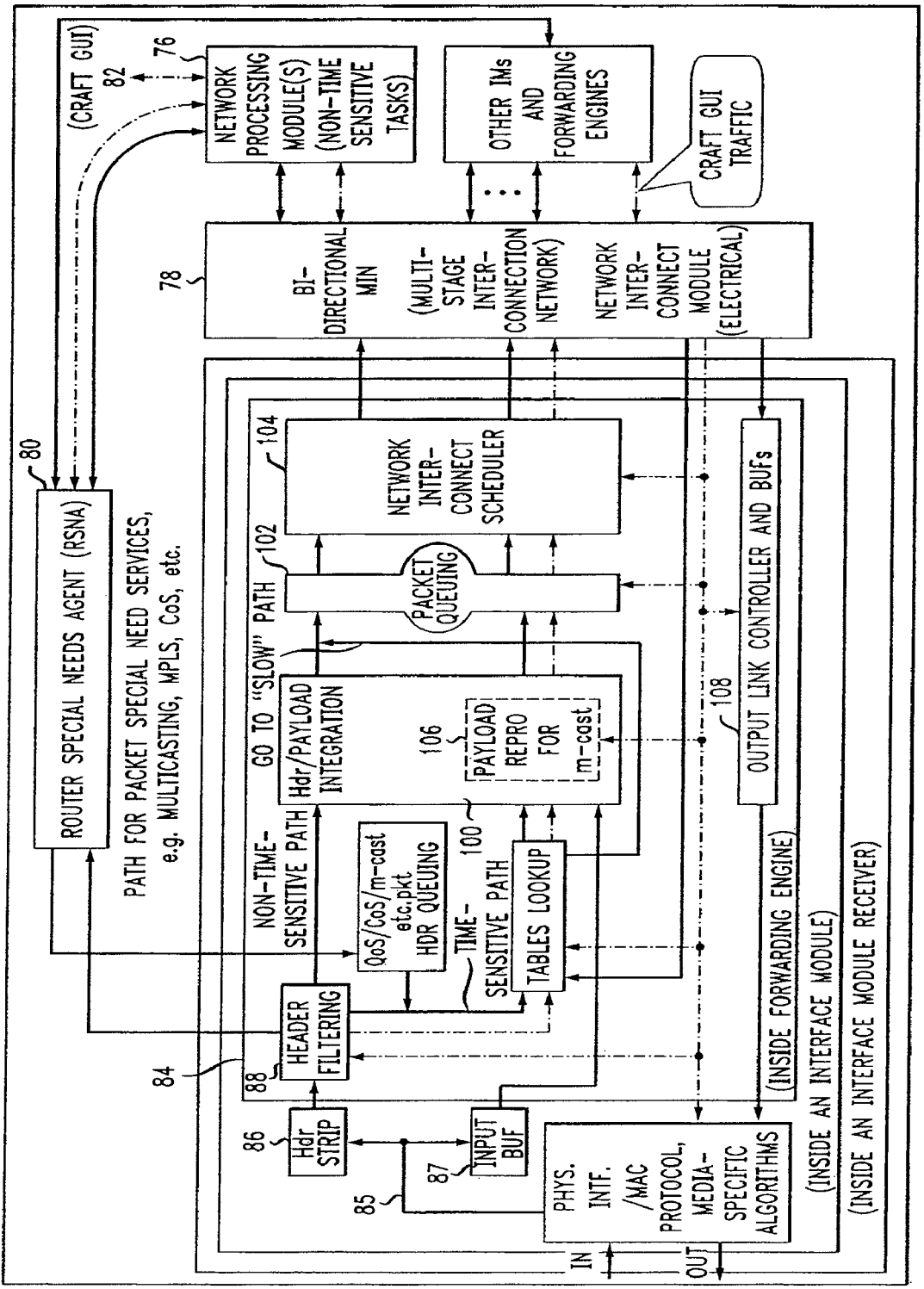
FIG. 5 is a functional block diagram of a BRLS Router Internal showing three logical packet/header processing paths.

Referring now to FIG. 5, in which like elements of FIG. 4 are provided having like reference designations, a Baseline Reconfigurable Limited Scalable (BRLS) router is shown. The router is similar to the BRLS router described above in conjunction with FIG. 4 except that in this embodiment, the switch fabric used for the NIM 78 is implemented as a multistage interconnection network (MIN). As mentioned above, the MIN switch fabric is capable of serving as a scalable reconfigurable (and bi-directionally reconfigurable) router including a scalable reconfigurable IP router.

It should be noted that when the k-ary N-cube switch fabric is used, transit traffic propagates between the NIM 78 and the output link controller and buffers 108 in each IM. When MIN switch fabric is used, however, no such path exists. Thus, one difference between the k-ary n-cube and BMIN SFs is that no transit traffic is possible through the IM, as all transit traffic visits the intermediate switching elements (SEs) only. Consequently, output buffers in the IM are not used to buffer any (segments of) transit packets in a BMIN SF.

It should be appreciated that the functional description and architectural layout for the BRLS architecture using the k-ary n-cube SF described above in conjunction with FIG. 4 in general applies to that for the BRLS using the bi-directional MIN (BMIN) SF shown in FIG. 5. Differences are explained below.

The NIM is a bi-directional MIN consisting of the N×N entities that are IMs, NPM(s) and RSNA, interconnected together via $O(N \log_b N)$ intermediate switching elements (SEs) and $O(N)$ bi-directional electrical channels. The SEs are implemented with (re-)programmable hardware components such as ASICs or FPGAs.

It should be noted that the number of IMs/NPM(s) residing in each of the N×N entities, as well as the BMIN interconnection pattern is implementation dependent. Moreover, the NIM can use more than one BMIN to provide QoS/CoS and fault-tolerance. Other functional descriptions of the NIM for a BRLS router using k-ary n-cube SF hold for the BRLS router using BMIN SF.

The functions of packet queuing and scheduling are also needed inside the IM rather than relegating them entirely to the SEs, to exercise the principle of divide and conquer as explained in the Tse-Au thesis referenced earlier. Packet queuing and scheduling inside the IM is to accommodate the possibility of QoS/CoS provisioning needs for (some) packets, whereas packet queuing (and any scheduling) inside SEs accommodates the case of internal blocking and path sharing that are characteristic of some types of BMINs. The result of applying the divide and conquer principle greatly simplifies the implementation and packet switching process of the SEs. For example, SEs no longer need to perform initial packet QoS prioritization based on policies/rules. This lessens the delay of this potential switching bottleneck in a packet's path to destination.

The set of output buffers within an IM includes reassembly buffers to reassemble segmented packets, and packet smoothing buffers to meet QoS provisioning/service level agreements (SLA) guarantee requirements. Moreover, it also includes packet re-sequencing buffers to accommodate scenarios in which packets can be delivered OOO due to techniques employed to overcome hot spot traffic conditions in MINs, such as during uplink access.

Output link schedulers are needed in each IM to properly schedule packets to available output links during network congestion or emergency situations.

Based on the above descriptions for the IM, all IM architectural components remain the same as used for the case when the NIM is a direct network k-ary n-cube. Thus, the principle of hardware reconfigurability (availability of a unified internal hardware architecture) has been applied to achieve a unified internal hardware architecture for the IM, thereby resulting in a reconfigurable IM functional architecture in any level of the network hierarchy capable of interconnecting to either direct or indirect NIMs.

Assuming self-routing property, NPM(s) need not distribute an internal SF routing table.

It should be noted that in FIG. 5, all connections between the RSNA and NPM(s), and between RSNA and IMs are actually part of the NIM. As FIG. 5 is a functional block diagram, they are drawn away from the NIM to clearly illustrate their functional interworking relationship.

Figure 6:
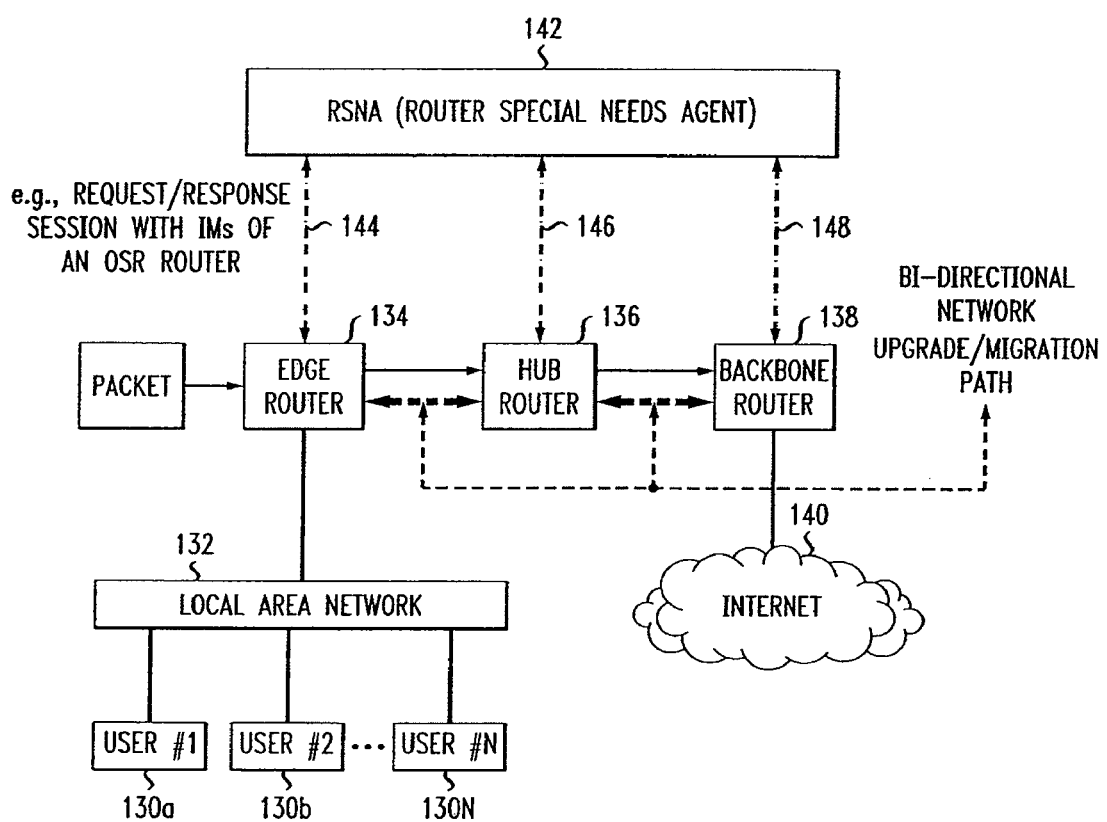
FIG. 6 is an overall network view diagram of a One-Architecture-Fit-All Scalable Reconfigurable Router (OSR)

Referring now to FIG. 6, a network includes a plurality of user nodes 130a-130N coupled via a local area network (LAN) 132. The LAN 132, in turn is coupled to an "edge" router 134 which receives packets transmitted thereto. The "edge" router is coupled to a "hub" router 136 which is in turn coupled to a "backbone" router 138 which provides a path to the Internet 140. Each of the edge, "hub" and "backbone" routers is coupled to an external router special needs agent (RSNA) 142. Thus, there is a connection to the RSNA from each router in the network (e.g. via request/response sessions 144-148 with the IMs of each of the respective routers). A router architecture which utilizes an external RSNA is referred to herein as a one-architecture-fit-all scalable reconfigurable router (OSR).

The RSNA function is always on for an OSR router designated as "edge", but may be off for an OSR router designated as either "hub" or "backbone." Bi-directional reconfigurability immediately follows with this on/off flexibility to the RSNA, which can be used either during network hardware expansion/upgrade or emergency situations.

For example, if a "hub" or "backbone" router unexpectedly stops operating, the network hierarchy can be re-configured such that a nearby "edge" router can perform the functions of the "hub" router by turning off the RSNA connections as called for by the implementation. The converse is also true, that is, if an "edge" router unexpectedly stops operating, the network hierarchy can be re-configured such that a nearby "hub" or "backbone" router can perform the functions of an "edge" router by turning on the RSNA connections. This induces network reliability, provided that RSNA is also redundant.

Figure 7:
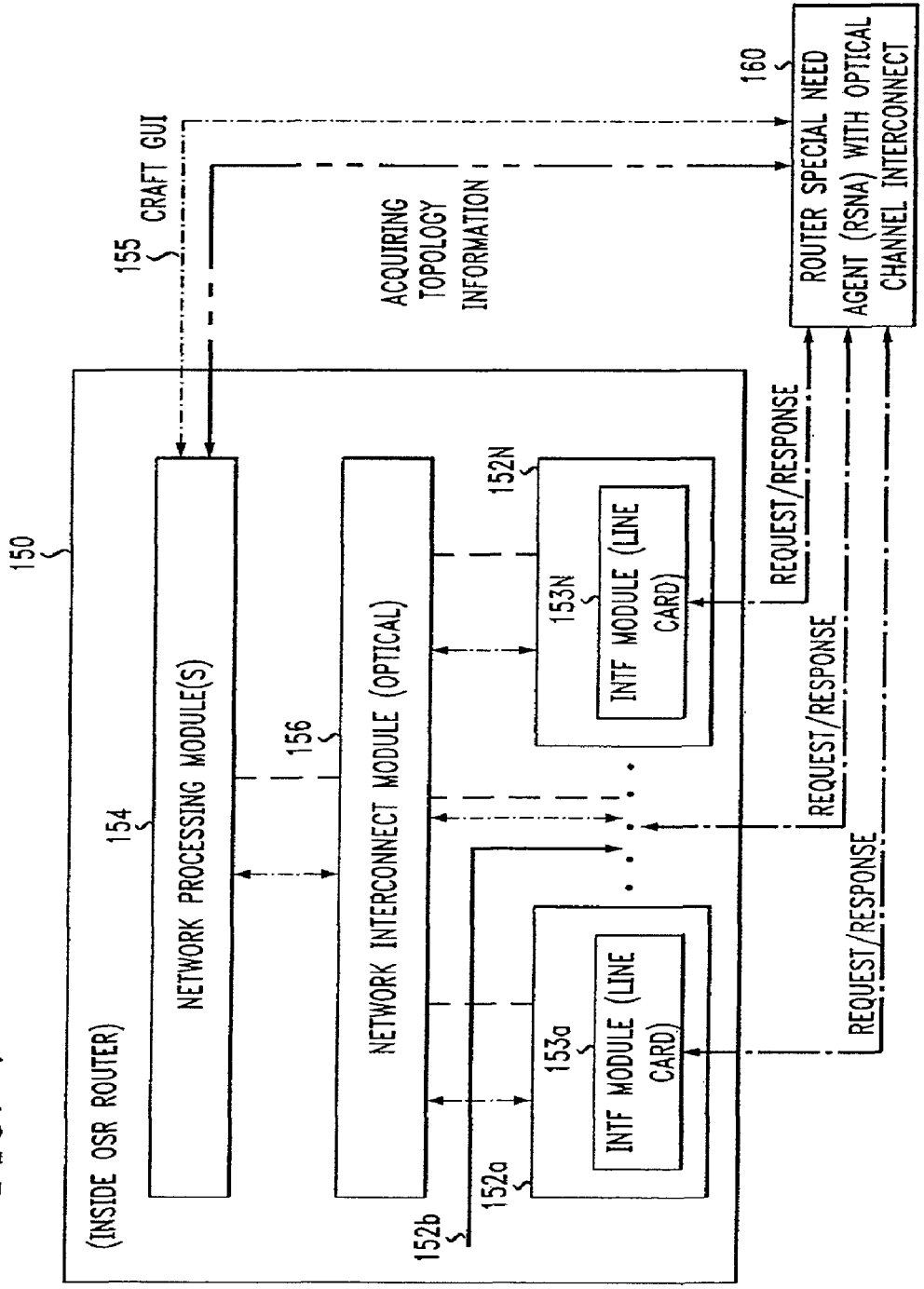
FIG. 7 is a block diagram of an architecture for a One-Architecture-Fit-All Scalable Reconfigurable (OSR) router.

Referring now to FIG. 7, an OSR router 150 includes a plurality of general purpose IM receivers 152a-152N each of which includes an interface module or line card 153a-153N. The IM receivers and interface modules may be similar to the IM receivers and interface modules described above in conjunction with the BRLS router of FIG. 3. Differences between the OSR and BRLS routers are described below in conjunction with FIG. 8. The OSR router 150 also includes a network processing module (NPM) 154 coupled to the IM receivers 152a-152N through an optical network interconnect module 156. It should be appreciated that the IM receivers 152a-152N, the network processing module 154 and network interconnect module 156 are all physically located inside the OSR router 150.

A router special needs agent (RSNA) 160 having an optical channel interconnect is in communication with the interface modules 153a-153N of the IM receivers, the network processing module 154 and a craft GUI 155. It should be appreciated that the RSNA 160 is physically located outside the OSR router 150.

The RSNA's communication strategy with other network elements such as the OSR router 150, is similar to that used in the BRLS architecture. For example, the RSNA communicates with the IMs of the OSR router via request/response signals. For communication with the NPMs of the OSR router (to acquire topology information), the communication could be via file transfer, depending upon the particular implementation. By decentralizing the RSNA functionality as a separate independent network element, scalability of the QoS control plane functions is enhanced and the implementation of the data plane functions in the routers are greatly simplified. The end result is a speedy/simplified forwarding path/data plane at the routers for processing all packets (including "regular" packets, packets requiring the attention of the NPM and "special needs" packets).

Flexible bi-directional reconfigurability can be achieved during emergency situations for "edge" routers (to act as temporary "hub/backbone" routers) by clustering together several "edge" routers to meet the throughput requirements of a "hub/backbone" and to turn off RSNA (as called for by the implementation).

Flexible bi-directional reconfigurability can be achieved during emergency situations for "hub/backbone" to act as "temporary" edge routers by simply turning "on" the RSNA.

Bi-directional reconfigurability can also be achieved during a network hardware upgrade/expansion process to increase traffic throughput for "hub/backbone" routers to automatically become new "edge" routers by turning on the RSNA, providing the quickest provisioning turn-around time.

Bi-directional reconfigurability can also be achieved during a network hardware upgrade/expansion process to increase traffic throughput for "edge" routers to become "hub/backbone" routers by adding more IM receivers, IMs and channels, and by turning off the RSNA (as called for by the implementation). It should be noted that the limit on the top number of receivers is bound by engineering choice in practice and that the above addition can be made possible only if the existing IMs and channel wires in the existing NIM infrastructure have enough capacity ready for expansion when first implemented. This means the existing IMs should have sufficient number of interface pin-outs and existing channels should have sufficient BW capacity to cope with the increased traffic volume resulting from an increased number of IM traffic sources.

Based on the above description, the RSNA's responsibility includes not only the traditional set of QoS control and resource reservation such as path selection/BW reservation, it also includes any special packet forwarding needs that require information on overall network "path" view such as network-wide path resource reservation, capacity and path state, to enable meaningful services. Examples of the latter are MPLS, multicasting, VPN provisioning, and MPLS-enabled VPNs.

Like the BRLS router, a key requirement to the success of this architecture is a general-purpose IM receiver that's identical in all routers, which enables the OSR's versatility to serve as "edge", "backbone" or "hub" routers as desired. As the receiver is identical in all OSR routers, the difference in throughput between an "edge" and a "hub/backbone" router is achieved using modular interconnection. This means that an "edge" router will have a smaller number of IMs/IM receivers (thereby curtailing the amount of throughput) than a "hub/backbone" router.

Figure 8:
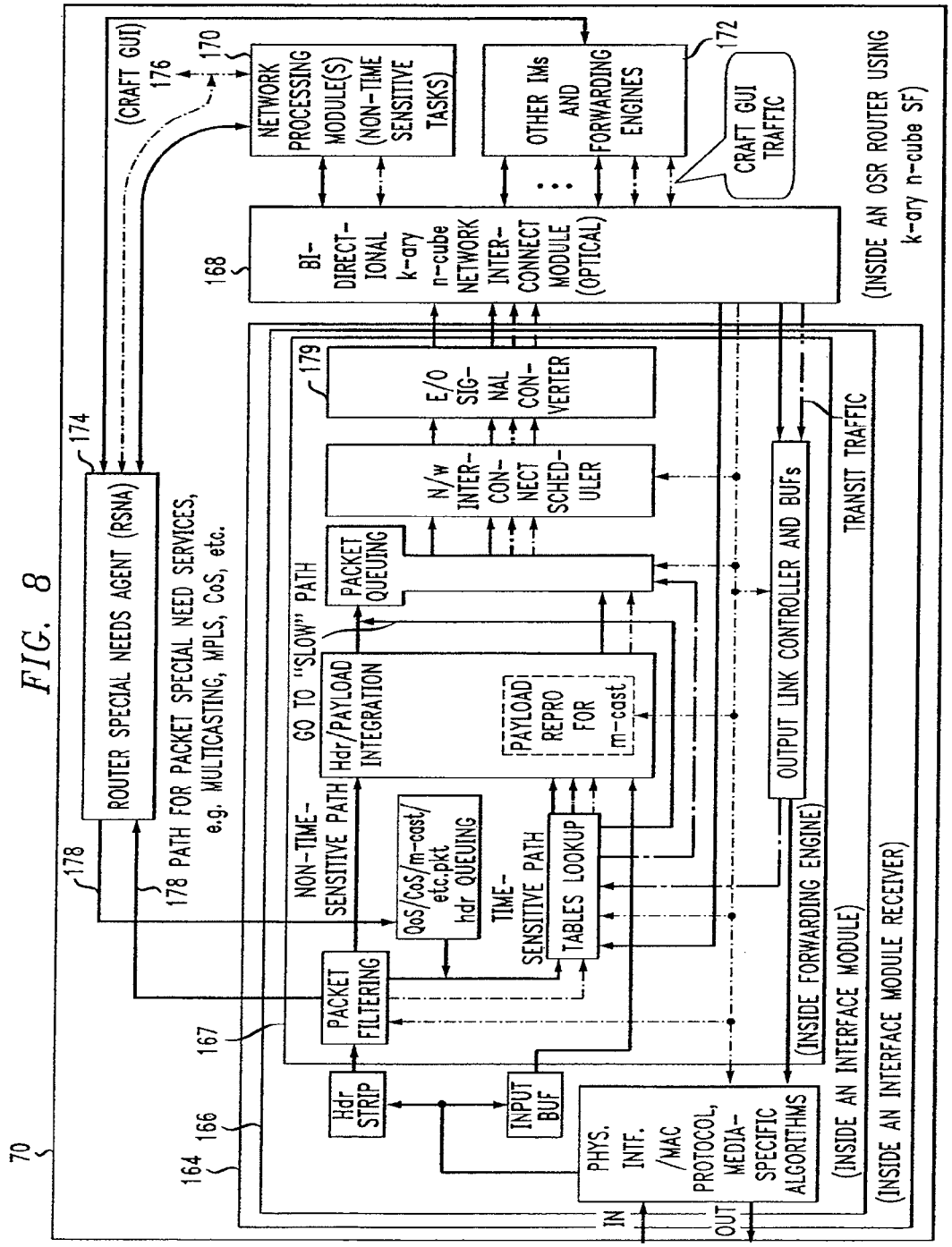
FIG. 8 is a functional block diagram of an OSR router using K-ary N-cube as the switch fabric and showing three logical packet/header processing paths.

Referring now to FIG. 8, an OSR router 164 includes an IM receiver 166 coupled to a bi-directional K-ary N-cube network interconnect module 168 (i.e. a K-ary N-cube switch fabric is used) which in turn is coupled to one or more network processing modules 170 and other IM and forwarding engines 172. The IM receiver 166, network processing modules 170 and other IM and forwarding engines 172 may all be functionally similar to the IM receiver, network processing modules and other IM and forwarding engines described above in conjunction with FIG. 4. It should thus be appreciated that the functional description of the IM for the BRLS router described above in conjunction with FIG. 4 applies to that for the OSR router 164, with certain differences as will be described below.

The IM receiver 166, network processing modules 170 and forwarding engines 172 are each coupled to an RSNA 174 which is external to the OSR router 164. Thus, one difference between the BRLS router and the OSR router 164 is that in the OSR router the RSNA is not part of the router's internal architecture, but is a completely separate network entity. Since the RSNA is a completely separate network entity, IMs must access it via an "external" communications link 178.

Another difference between the BRLS router and the OSR router 164 is that in the OSR router, the NIM is optical and the IM interior is electrical. Thus, there is an additional device 179 at the IM's optical channel interface to the switch fabric for signal conversion between electrical and optical (E/O) signals. In practice, vertical cavity surface-emitting lasers (VCSELs) can be used to provide a low-cost solution to such conversions for optical-electrical interconnect.

The RSNA 174 is a distinct server/database entity responsible for the CoS/QoS Control Plane that dynamically provides packets with resource and reservation information pertaining to overall network view, rather than hop-by-hop. The basic functionalities of the RSNA are as described above in conjunction with FIGS. 3-7. Some details of these functions, their associated architectures and the interworking of these functions both internal to the RSNA and with other router component(s) external to the RSNA are described below and in conjunction with FIG. 9

Figure 9:
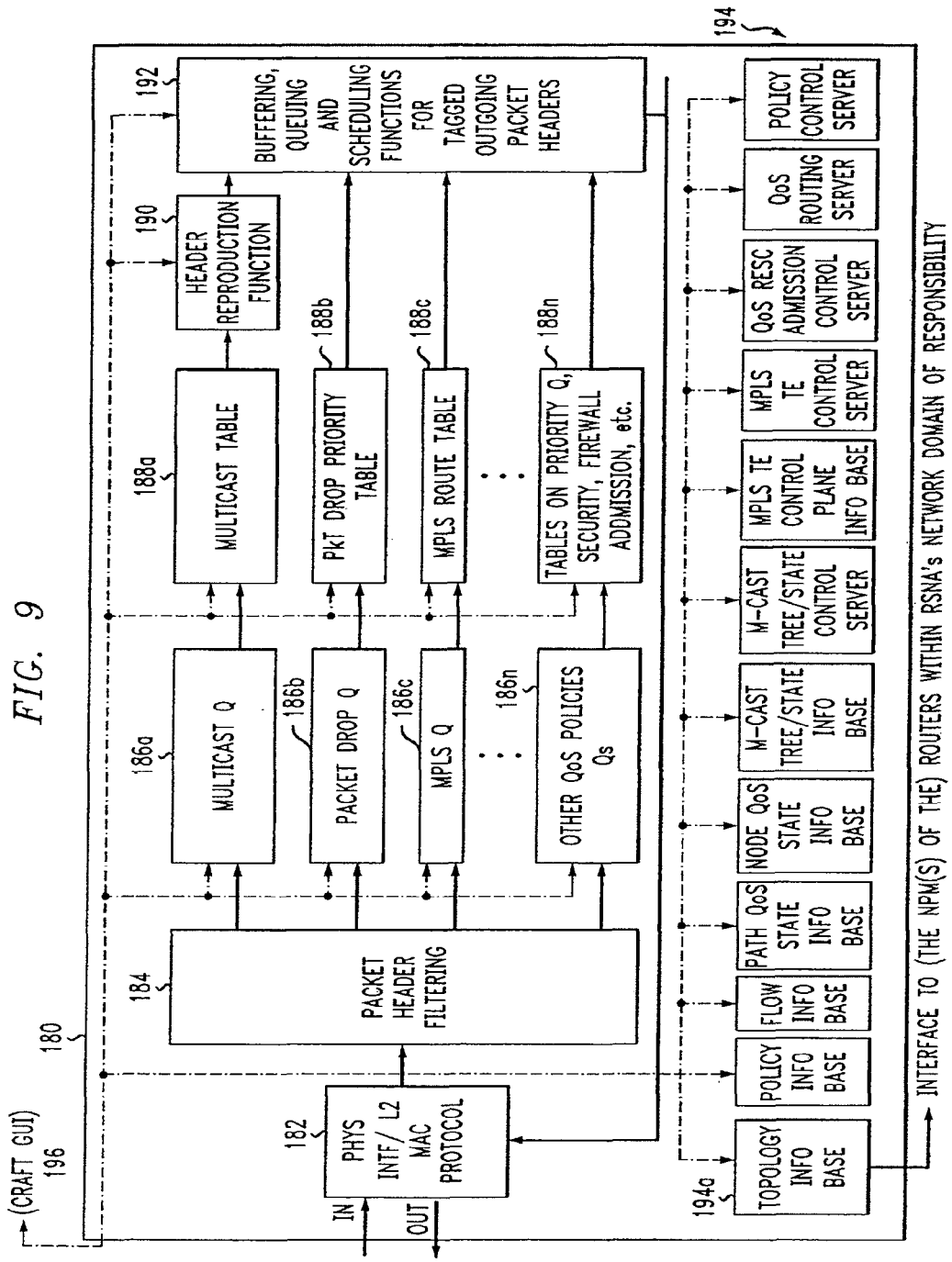
FIG. 9 is a functional block diagram of a Router Special Needs Agent (RSNA) having an OSR or optoelectronic one-architecture-fit-all scalable reconfigurable (OOSR) router architecture.

Referring briefly to FIG. 9, an exemplary RSNA 180 illustrating the parallel pipelines for the different types of packet header classification operations includes physical interface 182 through which headers of packets (or in alternate embodiments, entire packets) enter and exit the RSNA. The physical interface couples to a packet header filter 184 which performs packet header filtering. The packet header filter communicates with a plurality of separate/independent queues 186a-186n and tables 188a-188n for separate types of QoS/CoS needs. The exemplary RSNA of FIG. 9 is shown to include a multicast table, a packet drop priority table, and tables for CoS/QoS admission, access control, and security admission. Although, several exemplary queues and tables are shown in FIG. 9, it should be appreciated that the RSNA can include any type and number of queues and tables required for any QoS/CoS need.

The multicast table 188a leads to a header reproduction functional unit 190 which in turn is coupled to an output buffer, queue and scheduler 192. The tables 188b-188n are coupled directly to the buffer, queue and scheduler 192. The buffer, queue and scheduler 192 buffers, queues and performs scheduling functions for newly tagged outgoing packet headers and provides the headers to the physical interface 182.

Because the individual functions in the RSNA can be (re-) programmable, a craft GUI interface 196 is available for this purpose. Through the craft GUI, new algorithms (e.g., for individual server computational use) or new administrative rules/policies can be rapidly installed into the appropriate functional components to adapt to the changing IP network servicing features. In this particular example, the RSNA includes a plurality of information bases and servers generally denoted 194 which will be discussed below.

Referring now to FIGS. 8 and 9, the RSNA is responsible for admission control as well as for resource reservation/management, e.g., buffer (re-)configuration, path selection/reservation for MPLS traffic engineering, multicasting and customized VPN provisioning on demand. Also, for MPLS traffic engineering, RSNA is responsible for the major MPLS control plane functions (and hence RSNA can be said to be equipped with the MPLS traffic engineering control plane) as follows: resource discovery; path selection; and path management. For multicasting, the RSNA participates in routing, flow and reservation protocols, computes shortest path multicast trees/inter-domain multicast tunnels, performs admission control, reserves/allocates network path resources, and setup and maintains multicast trees/tunnels among admitted hosts. The RSNA is also responsible for policy administration for differentiated CoS, packet drop, RSVP, security/access control, scheduling, and prioritization of flows. Hence the information bases and servers 194 must be able to aid in the enablement of such functionalities.

RSNA architectural scalability is addressed by complete functional partitioning of basic packet header classification/processing functions: header filtering, queuing per QoS/CoS/other "special needs", table lookup per QoS/CoS/other "special needs", header reproduction for multicasting, buffering and scheduling. Each of these functions has its own data structures and memory capacity and is implemented by (re-)programmable hardware-based ASICs or FPGAs. Furthermore, as illustrated in FIG. 9 the functions are arranged in series as pipelines if there exists inter-dependence among functions, or in parallel if there is no inter-dependence.

Since communication with the routers (and more particularly with the Ns of the routers) in the RSNA's network domain of responsibility is via request/response, a request message enters the RSNA with a packet header needing a "tag" and a response from the RSNA with an "updated" packet header containing the needed "tag." For the case of multicasting, the RSNA is responsible for reproducing all the headers with different destination addresses needed for a particular multicast session, this is done by the Header Repro Function 190.

The link state information bases and servers 194 maintained at the RSNA, include but are not limited to a topology information base, a policy information base, a flow information base, a path QoS state information base, a multicast tree/state information base and control server, an MPLS Traffic Engineering Control Plane information base, node QoS state information base, an admission control server, a QoS routing server, a policy control server and an MPLS Traffic Engineering control server (e.g., for MPLS path computation).

Sample contents of the multicast tree/state information base includes information needed to establish multicast sessions for all routers within the RSNA's domain of responsibility, such as access control list, multicast tree/tunnel state information for the multicast groups that each router in its domain is involved in.

All information bases contain up-to-date link/path/flow state and status information, and a variety of policy information, such that they act as information input to the individual tables that ultimately provide "tags" to the incoming packet headers. For example, RSNA collaborates with the NPM of each router within its domain of responsibility to obtain up-to-date topology information for path selection/setup. The servers perform path computations based on information from appropriate information bases. Results of computation are also fed to the appropriate tables.

For the RSNA within the OSR architecture, all-optical channels are used for interconnecting all internal components such as the functional units and servers as follows. All (re-)programmable hardware-based electronic (FPGA or ASIC) chips containing functional units such as packet filtering, scheduling, etc., along with the associated tables and buffers (i.e., the queues 186a-186n) are arranged in ≧one card interconnecting to one another within each card via electronic interchip interconnect. An E/O device (e.g., a VCSEL) is used at each card/optical channel interface for interconnection to other components within the RSNA. All information bases and servers are also equipped with E/O devices at their interfaces to the optical channels for connection to other components within the RSNA. Finally, redundancy is addressed via 1+1 sparing arrangement with other RSNAs within the ISP network.

This architecture having all-optical interconnects for the interior of both the RSNA and the OSR router, is readily implementable with the current state-of-the-art technology. Within the framework of this router architecture, network hardware expansion or upgrade—the ability to accommodate a next more feature-rich set of QoS capabilities and with increasing throughput requirement, can be addressed by a distributed two-part network solution. It includes the upgrade of the OSR router and the RSNA with "appropriate" tables and algorithms for fast table search to provide appropriate QoS features. Scalability of both network entities to meet increasing throughput demands is further provided by the partitioning and pipelining of the functionality and by the (re-)programmability of each hardware-based function used in the packet (or header) processing paths within the two separate network entities. This arrangement allows parallelism of operation and thus enables the RSNA and the OSR router the ability to separately scale efficiently to very high speed.

The decentralization of the RSNA as a separate entity allows it to serve, and therefore scales to, an arbitrarily large number of routers in its network domain of responsibility. The upper bound of this number is part of overall network planning, considering factors such as the expected volume of "special needs" traffic from each router within the network, the type of queuing disciplines used to provide differentiated packet header processing within the RSNA to ensure line rate packet processing at the originating routers, etc. This decentralization also enhances the scalability of the QoS control plane functions thereby enabling the capability to offer value-added services on OVERALL network path basis, keeping minimal to no QoS state information in the routers. The consequence is this architectural solution's ability to adapt to the constant changes in "whole path" QoS/CoS provisioning along with exponential traffic growth within an IP network into the foreseeable future.

The functional description of a NIM for the BRLS router using k-ary n-cube SF applies to that for the OSR router using k-ary n-cube SF with two differences: (1) the RSNA is not part of the router's internal architecture for the OSR and (2) the NIM 168 is made of all optical channels (vs. electrical channels in the BRLS router). With respect to the first difference, the RSNA is a completely separate entity and therefore the NIM doesn't need to be responsible for internal transfer of: (a) packet headers with "special needs" to the RSNA; and (b) (segments of) packets between the NPM and the RSNA such as updated/new programs to (re-)program the (re-)programmable hardware-based functions within the RSNA.

Likewise, the functional description of an NPM for the BRLS router using k-ary n-cube SF applies to that for the OSR router 164 with one difference being that the NPM will have optical channel interfaces; and for that interface, a device capable of converting optical signals to electrical signals and vise versa (i.e., E/O device will be used at that interface).

Referring again to FIG. 8, craft GUI 176 external to both the router 164 and RSNA 174 is provided to (re-)program/(re-)configure all hardware-based algorithms in the IMs 167 of the router through the NPM. As RSNA 174 is a separate network entity, it has its own separate craft GUI 196 (FIG. 9) not from the NPM for (re-) configuration of its internal hardware-based algorithms. The NPM 170 still communicates with the RSNA 174 for network topology updates via a separate interface to the topology information base 194a (FIG. 9).

Figure 10:
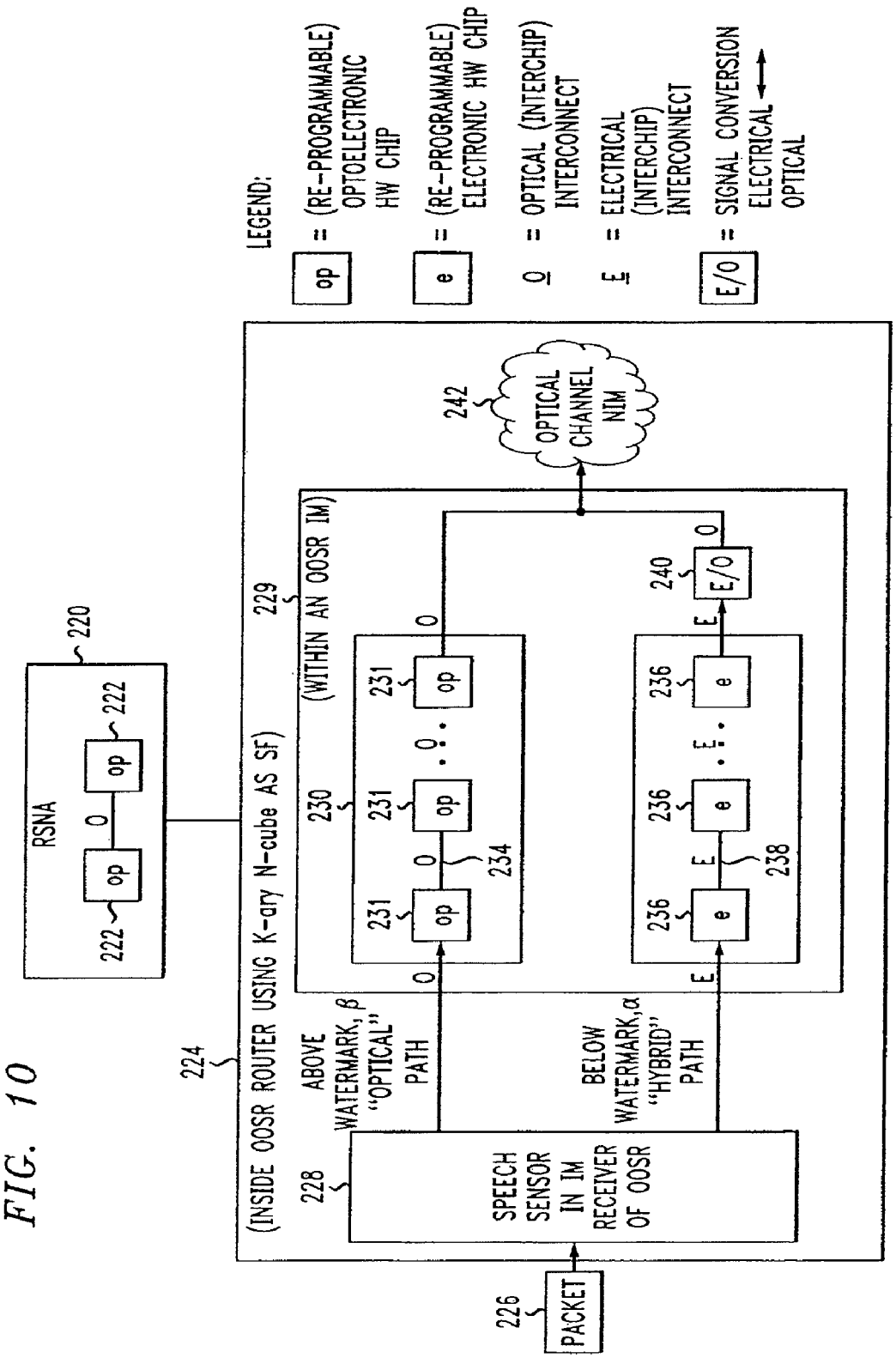
FIG. 10 is a functional block diagram of an optoelectronic one-architecture-fit-all scalable reconfigurable (OOSR) router showing a speed-sensing general-purpose interface module (IM) receiver and dual intra-IM interconnection technologies.

Referring now to FIG. 10, an RSNA 220 having an optical channel interconnect 222 is coupled to an Optoelectronic One-Architecture-Fit-All Scalable Reconfigurable (OOSR) router 224. A packet 226 enters the router 224 and is detected by a speed sensor 228 within an IM receiver of the OOSR router 224. The IM 229 includes first and second paths 230, 232. The first path 230 corresponds to an "almost all-optical" path (also sometimes referred to herein simply as the "optical path") and may be provided, for example, from one or more re-programmable optoelectronic hardware devices 231 (e.g. FPGAs, ASICs, etc. . . . ). As will become apparent in subsequent explanations, the only non-optical components in this path are the opto-electronic hardware devices. Each of the devices 231 are coupled via an optical interconnect 234. The second path 232 corresponds to an all electrical path and may be provided, for example, from one or more re-programmable electronic hardware devices 236. Each of the devices 236 are coupled via an electronic interconnect 238. At the end of the second path is an electrical-to-optical (E/O) converter 240. Both the first and second paths lead to an optical channel NIM 242 that in turn also connects to other OOSR IMs with dual hardware technology paths as described above.

In operation, the speed sensor 228 detects the relative speed of the IM connection. If the detected speed is below a certain "watermark" (e.g., at or below OC 12), the IM receiver directs the packets to the optical channel NIM 242 via the second 232 path within the IM 229 and the E/O converter 240. If, on the other hand, the incoming packet speed is above the "watermark", the IM receiver directs the packets to the optical channel NIM 242 via the first 230 path within the IM 229.

Since the almost all-optical path 230 is faster than the electrical path 232, the routing speed through the IM is different depending upon the path. Thus, based on sensor result, the IM receiver "adjusts" the routing speed of the packet within the receiver by sending the packet through either path 230 or 232 within the IM 229 according to packet incoming speed.

It should be noted that regardless of the path 230, 232 on which the packet is routed through the IM, packets in each path 230, 232 will still have the three logical processing paths (i.e. time-sensitive, non-time-sensitive or RSNA as described above) available for processing the packet depending upon packet processing requirements as indicated by information in the header.

It should be understood that although the RSNA is here shown as an external RSNA, there may be some embodiments in which it would be desirable to provide the RSNA as an internal RSNA while still maintaining the optical and electrical paths within the IM.

Figure 11:
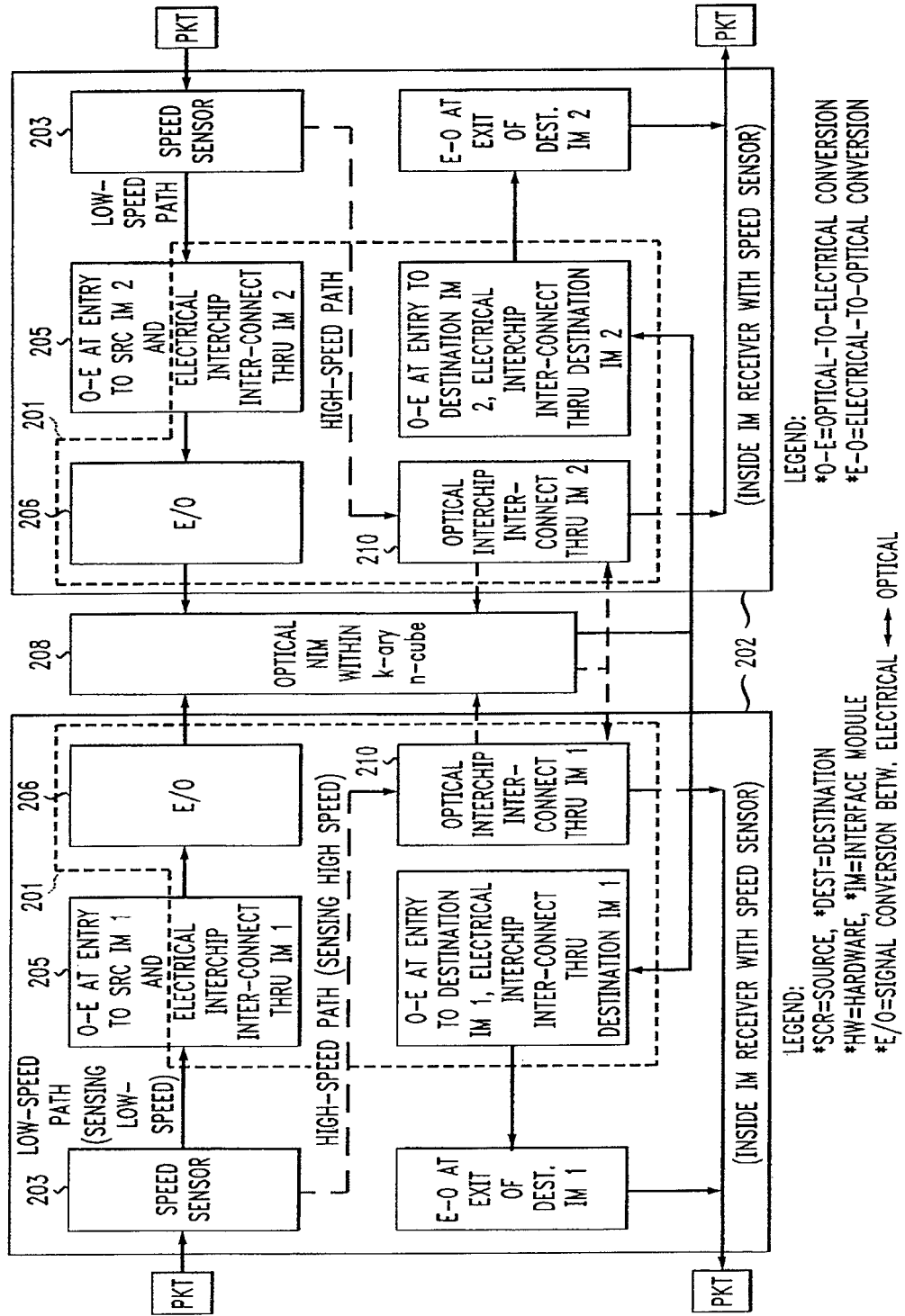
FIG. 11 is a functional block diagram of an Optoelectronic One-architecture-fit-all Scalable Reconfigurable (OOSR) Router.

Referring now to FIG. 11, an Optoelectronic One-Architecture-Fit-All Scalable Reconfigurable (OOSR) Router Architecture using K-ary N-cube switch fabric includes a set of IM receivers 202, each containing a separate IM 201 with a forwarding engine. The IMs 201 have primary responsibility for the processing of "regular" packets. It should be appreciated that FIG. 11 shows an overall view of the OOSR router (without the RSNA) using k-ary n-cube SF and two IM receivers 202.

The IM receiver 202 includes a speed sensor 203 to be described further below. The OOSR router also includes centralized Network Processing Module(s) (NPMs) responsible for the processing of non-time-sensitive/exception condition tasks, e.g., routing maintenance, management, error protocol operations and a QoS preserving optical Network Interconnect Module (NIM) 208, comprising of the IMs and the NPMs interconnected together as nodes in a k-ary n-cube via bi-directional optical links. The NIM is provided having an appropriate architecture and/or arbitration, scheduling or routing algorithms, for preservation of QoS. It should be appreciated that in the case where the NIM is provided as a BMIN, the BMIN can be provided from optical channels and optoelectric hardware-based switching elements.

The OOSR architecture is similar to the OSR 164 of FIG. 8 in that networks (including but not limited to IP networks) using OOSR routers also rely on the use of general-purpose IM receivers and has an RSNA as the additional (separate) network entity for processing the QoS Control Plane and some data plane functions for "special needs" packet headers.

The RSNA dynamically provides resource and reservation information pertaining to overall network view, rather than in a hop-by-hop manner. An "edge" router's RSNA connection must always be on and a "hub/backbone" router's RSNA connection may be off. One difference between the OOSR router and the OSR router 164, however, lies in the chip and interchip interconnection technology. In particular, the OOSR utilizes an optoelectronic chip with optical interchip interconnect in both the RSNA and the IM as further explained below.

Similar to the RSNA for the OSR architecture, the internal (packet header processing) functions of the RSNA in the OOSR architecture are independent hardware-based functions. Each of these functions has its own dedicated data structure and storage capacity needed to perform its dedicated operation and is implemented using (re-) programmable hardware components such as FPGAs. However, instead of electrical interconnection amongst the logic level (FPGA) chips, these chips are optically interconnected to one another in pipeline fashion where functional inter-dependence exists i.e., optical (interchip) interconnect within the RSNA (see FIG. 10). The RSNA continues to provide a scalable separate QoS/CoS control plane server and information base along with some data plane functionalities.

As FPGAs are electrical components, optoelectronic FPGAs are used to interface with the optical interchip interconnect, rather than the electronic FPGA chips. Hence, packet headers processing are done using optical interconnect amongst the optoelectronic FPGA chips as it traverses through the RSNA.

On the other hand, the IM (as explained about the two paths 230 and 232 in conjunction with FIG. 10 above) is implemented with two types of chip technologies and two types of interchip interconnect technologies. The chip technologies are respectively, optoelectronic FPGA and pure electronic FPGA; whilst the interchip interconnect technologies are respectively all-optical and all-electrical. Hence the IM interior is composed of two distinct parts. An optical part with optoelectronic (FPGA) chips optically interconnected to one another and an all-electrical part with regular electronic (FPGA) chips electrically interconnected to one another. Consequently, the IM's 201 include optical to electrical O-E conversion 205 at entry to the IM and electrical to optical converters (E/O) 206 at exit from the IM (into the optical SF 208). Thus, the IM utilizes dual hardware technologies (optical and electrical). The purpose of these dual (chip and interchip-interconnect) hardware technologies will become apparent from the description below. Similar to the OSR using k-ary n-cube SF, the interconnection technology of the NIM 208 remains all-optical as alluded to above.

It should be appreciate that even though the E-O and O-E conversions are drawn as part of the IM receiver in FIG. 11 (and not as part of the IM), in some embodiments it may be desirable or necessary to implement a system either way. That is, the E-O and O-E conversions can be implemented as either part of the IM or as part of the IM receiver.

The IM receiver 202 includes the speed sensor 203 that can detect the relative speed of the IM connection. In one embodiment, for purposes of efficient network hardware expansion/upgrade, (i.e. an upgrade which can be accomplished via re-programming a chip) the speed sensor is implemented as a speed sensing algorithm in a programmable hardware-based component. It should be appreciated, that the hardware-based sensor algorithm applies only to the IM receiver within the router and not the RSNA in this OOSR architecture, which will always route traffic using the optical interconnect and hence no need for speed sensing. This is due to the fact that incoming traffic to the RSNA will always occur at high speed, as an RSNA serves >1 router within its network domain of responsibility for a network using the OOSR router architecture.

Based upon sensor result, the IM receiver 202 will perform a "routing speed adjustment" (i.e. the receiver can "speed up" or "slow down"). It will cause the packets to be routed via electronic inter (FPGA) chip interconnect through the IM using the optical-to-electrical (O-E) conversion 205 at the link interface if the detected speed is below a certain "watermark" (e.g., at or below OC 12), i.e., an electrical interchip interconnect through the IM 201 will be provided.

If, on the other hand, the detected incoming packet speed is above the "watermark", the IM receiver 202 will cause incoming packets to be routed via optical interchip interconnect 210 through the IM. It should be noted that whichever (physical) hardware path the packet is routed through, packets in each hardware path will still have the three logical processing paths time-sensitive, non-time-sensitive or RSNA as described above to process through depending upon the packet processing requirement as indicated by information in the header.

With the aid of these speed-sensing general-purpose IM receivers 202 to perform routing speed adjustment through the IM according to incoming packet speed and a separate RSNA function with optical interchip interconnect, the interior architecture is uniform across all OOSR routers, regardless of its placement in the network hierarchy. Hence, the property of "bi-directional reconfigurability" is retained and is usable either during emergency situations or network hardware expansion/upgrade.

It should be noted that all functional descriptions for the OSR router 164 (FIG. 8) with respect to IMs, NIM, NPM and RSNA apply to the OOSR router. Two differences are that for the optical interconnect part of the IM in the OOSR router, no E/O device is needed at the optical SF interface within the IM (however, as in OSR, E/O device such as VCSELs is needed for the electrical part of the IM to interface to the optical channel interconnect). Similarly, since the packet header processing functions in the OOSR RSNA 220 (FIG. 10) are also implemented using optoelectronic (FPGA) chips with optical interchip interconnect 222 (FIG. 10), no E/O devices are needed for these functions to interface to the all-optical interconnection channels within the RSNA.

Use of the intelligent IMs provides the OOSR router having a distributed forwarding functionality. Also the OOSR router architecture provides segregation of time-sensitive from non-time-sensitive tasks amongst RSNA, IM and Network Processing Module.

An OOSR router architecture serves dual purposes. First, it provides a tool for router reconfigurability. A router serving at the "edge" will likely experience lower traffic rate (e.g., currently $\leq$OC48) than that experienced in a "hub" or "backbone" router. Hence a router placed in the "edge" layer makes use of the electrical interconnect through the IMs; whereas if that same router is placed in the "hub" or "backbone" layer, would make use of the optical interconnect through the IM. Second, it serves as "transition" architecture to usher in technological evolution from electronic devices, with its ultimate limitation in electronic processing speed, to optical devices.

The OOSR is appropriate in applications in which there exists a customer base at the "edge" of an ISP network with aggregate speed sufficiently low such that the service provisioning for these customers could still be economically accommodated by electronic routing through the router IM. Moreover, the additional intra-IM optical interconnect capability not only allows efficient transition to optical technology, but operating with the intra-IM electronic interconnect counterpart also allows an OOSR router to scale up to much higher magnitude in throughput than electronic intra-IM interconnect alone. The latter advantage is again due to the notion that there exists two different paths each with a different hardware technology through the OOSR router, making it possible for the router to process traffic with input speed of very low to very high magnitude. One "lower" speed hardware path composes of electronic chips and electrical interchip interconnect through the IM, and optical channel interconnect amongst the IMs through the router. The other "higher" speed hardware path composes of optoelectronic chips with optical interchip interconnect through the IM, and optical channel interconnect amongst the IMs through the router.

Finally, a potential advantage of the OOSR architecture, is that the problem of preserving constant packet delivery delay variation (such as prevention of jitteriness in voice packets) through the SF could be overcome, with optical interchip interconnect within the IM.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A router comprising:
an interface module, having an optical path and an electrical path; and
a speed sensor coupled between an input of the router and an input of the interface module, the speed sensor for receiving a packet and detecting a speed of an interface module connection and in response solely to the speed of the interface module connection being above a threshold value, the speed sensor provides the packet to the optical path of the interface module, and in response solely to the speed of the interface module connection being at the threshold value, or below the threshold value, the speed sensor provides the packet to the electrical path of the interface module.

2. The router of claim 1, further comprising:
an optical network interconnect module coupled to both the optical path and the electrical path of the interface module.

3. The router of claim 2, further comprising:
a router special needs agent coupled to the interface module through the optical network interconnect module.

4. The router of claim 3, further comprising:
a network processing module adapted to communicate with the interface module and the router special needs agent through the optical network interconnect module.

5. The router of claim 3, further comprising:
an interface module receiver adapted to receive the interface module and wherein the speed sensor is provided as part of the interface module receiver.

6. The router of claim 5, wherein the speed sensor receives packets, determines the speed of the interface module connection which comprises a network connection, and when the speed of the network connection is below the threshold value which comprises a predetermined value, the interface module receiver directs the packets to be routed to the optical network interconnect module via the electrical path of the interface module.

7. The router of claim 5, wherein the speed sensor receives packets, determines the speed of the interface module connection which comprises a network connection, and when the speed of the network connection is above the threshold value which comprises a predetermined value, the interface module receiver directs the packets to be routed to the optical network interconnect module via the optical path.

8. The router of claim 2, wherein the optical network interconnect module is provided from an optical bi-directional k-ary n-cube switch fabric.

9. The router of claim 2, wherein:
the optical path of the interface module comprises a plurality of optical components, each of the optical components coupled by an optical interconnect and wherein the optical path of the interface module extends from the speed sensor to the optical network interconnect module; and
the electrical path of the interface module comprises a plurality of electrical components, each of the electrical components coupled by an electrical interconnect and wherein the electrical path of the interface module extends from the speed sensor to an electrical-to-optical converter and wherein the electrical-to-optical converter is coupled to the optical network interconnect module.

10. An optoelectronic one architecture-fit-all scalable reconfigurable router comprising:
an interface module including an almost-all-optical path and an electrical path;
an interface module receiver comprising a speed sensor for detecting a speed of a packet entering the optoelectronic one architecture-fit-all scalable reconfigurable router, wherein in response solely to the speed of the packet entering the optoelectronic one architecture-fit-all scalable reconfigurable router detected by the speed sensor, the interface module receiver adjusts a routing speed of the packet within the interface module receiver by sending the packet through a path within the interface module according to the speed of the packet; and
an optical network interconnect module coupled to both the almost-all-optical path and the electrical path of the interface module.

11. The router of claim 10, wherein both the almost-all-optical path and the electrical path in the interface module have a time-sensitive logical processing path, a non-time-sensitive logical processing path and a special needs logical processing path.

12. The router of claim 11, further comprising a router special needs agent coupled to the interface module through the optical network interconnect module and wherein the router special needs agent is an external router special needs agent.

13. The router of claim 10, wherein the almost-all-optical path is provided from a re-programmable optoelectronic hardware device.

14. The router of claim 13, wherein the re-programmable optoelectronic hardware device is coupled via an optical interconnect.

15. The router of claim 10, wherein the electrical path is provided from a re-programmable electronic hardware device.

16. The router of claim 15, further comprising:
an electronic interconnect coupled to the electronic hardware device.

17. The router of claim 16, further comprising:
an electrical-to-optical converter disposed between one end of the electrical path and the optical network interconnect module.

18. The router of claim 17, wherein:
in response to the speed sensor detecting that the speed of an interface module connection is below a predetermined level, the interface module receiver directs packets to be routed to the optical network interconnect module via the electrical path of the interface module and the electrical-to-optical converter; and
in response to the speed sensor detecting that the speed of the interface module connection is above a predetermined level, the interface module receiver directs packets to be routed to the optical network interconnect module via the almost-all-optical path of the interface module.

19. The router of claim 10, wherein the optical network interconnect module is adapted to couple to a plurality of interface modules each of the plurality of interface modules having both an almost-all-optical path and an electrical path.

20. A method for operating router, comprising:
providing an interface module, having an optical path and an electrical path;
receiving a packet and detecting a speed of an interface module connection;
in response solely to the speed of the interface module connection being above a threshold value providing the packet to the optical path of the interface module; and
in response solely to the speed of the interface module connection being at the threshold value, or below the threshold value, providing the packet to the electrical path of the interface module.

* * * * *